(12) United States Patent
Willette et al.

(10) Patent No.: US 10,363,488 B1
(45) Date of Patent: Jul. 30, 2019

(54) DETERMINING HIGHLIGHTS IN A GAME SPECTATING SYSTEM

(71) Applicant: Amazon Technologies, Inc., Seattle, WA (US)

(72) Inventors: Michael Anthony Willette, Lake Forest, CA (US); Patrick Gilmore, Agoura Hills, CA (US); Ethan Zane Evans, Snoqualmie, WA (US); Michael Martin George, Mercer Island, WA (US); Michael Anthony Frazzini, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 14/754,575

(22) Filed: Jun. 29, 2015

(51) Int. Cl.
| | |
|---|---|
| *A63F 9/24* | (2006.01) |
| *A63F 13/00* | (2014.01) |
| *G06F 17/00* | (2019.01) |
| *G06F 19/00* | (2018.01) |
| *A63F 13/86* | (2014.01) |
| *A63F 13/54* | (2014.01) |
| *A63F 13/87* | (2014.01) |
| *G06F 3/048* | (2013.01) |

(52) U.S. Cl.
CPC .............. *A63F 13/86* (2014.09); *A63F 13/54* (2014.09); *A63F 13/87* (2014.09); *G06F 3/048* (2013.01)

(58) Field of Classification Search
USPC .................. 463/1, 20, 22, 25, 31, 39, 40, 42
See application file for complete search history.

(56) References Cited

U.S. PATENT DOCUMENTS

| | | | |
|---|---|---|---|
| 5,261,820 A | 11/1993 | Slye et al. | |
| 5,395,242 A | 3/1995 | Slye et al. | |
| 5,682,196 A | 10/1997 | Freeman | |

(Continued)

FOREIGN PATENT DOCUMENTS

| | | |
|---|---|---|
| JP | 2012065831 | 4/2012 |
| JP | 2013533000 | 8/2013 |

(Continued)

OTHER PUBLICATIONS

Wang, Jinjun, et al., "Sports highlight detection from keyword sequences using HMM", Multimedia and Expo, 2004, ICME'04, IEEE International Conference, pp. 1-5, vol. 1.

(Continued)

*Primary Examiner* — Adetokunbo O Torimiro
(74) *Attorney, Agent, or Firm* — Robert C. Kowert; Meyertons, Hood, Kivlin, Kowert & Goetzel, P.C.

(57) ABSTRACT

Methods and apparatus for determining highlights from broadcasts in spectating environments. A highlight service obtains highlight data for broadcasts including game- and participant-specified events, audio input, and text chat, analyzes the highlight data to determine notable events (highlights) in the broadcasts, and extracts highlight segments from the broadcasts according to the determined events. Highlight reels may be created from the highlight segments according to one or more highlight selection criteria and/or spectator preferences. The highlight service may provide access to the highlights and highlight reels via a highlight user interface (UI). The spectators may selectively view the highlights or highlight reels via the highlight UI.

28 Claims, 18 Drawing Sheets

(56) References Cited

U.S. PATENT DOCUMENTS

| | | | |
|---|---|---|---|
| 6,173,260 B1 | 1/2001 | Slaney | |
| 6,275,806 B1 | 8/2001 | Pertrushin | |
| 7,451,079 B2 | 11/2008 | Oudeyer | |
| 7,606,701 B2 | 10/2009 | Degani et al. | |
| 7,803,052 B2 | 9/2010 | Multerer et al. | |
| 7,940,914 B2 | 5/2011 | Pertrushin | |
| 8,078,470 B2 | 12/2011 | Levanon et al. | |
| 8,096,863 B2 | 1/2012 | Annunziata | |
| 8,308,562 B2 | 11/2012 | Patton | |
| 9,032,296 B1* | 5/2015 | Jeffs | H04N 21/8586 715/719 |
| 9,233,305 B2* | 1/2016 | Laakkonen | A63F 13/10 |
| 2002/0034980 A1* | 3/2002 | Lemmons | A63F 3/081 463/40 |
| 2002/0176000 A1* | 11/2002 | Katayama | H04N 7/17318 348/157 |
| 2003/0061610 A1* | 3/2003 | Errico | G06F 17/30017 725/46 |
| 2003/0220143 A1* | 11/2003 | Shteyn | A63F 13/12 463/42 |
| 2008/0119286 A1* | 5/2008 | Brunstetter | A63F 13/00 463/43 |
| 2008/0300700 A1 | 12/2008 | Hammer et al. | |
| 2010/0298055 A1* | 11/2010 | Kouhi | H04W 4/206 463/43 |
| 2012/0052476 A1 | 3/2012 | Graesser et al. | |
| 2012/0084812 A1* | 4/2012 | Thompson | H04N 21/25891 725/34 |
| 2013/0226983 A1* | 8/2013 | Beining | H04N 21/252 709/201 |
| 2014/0171039 A1 | 1/2014 | Bjontegard | |
| 2015/0139610 A1 | 5/2015 | Syed et al. | |
| 2016/0191959 A1* | 6/2016 | Chittella | H04N 21/4888 725/32 |

FOREIGN PATENT DOCUMENTS

| | | |
|---|---|---|
| KR | 2013-0122523 | 11/2013 |
| WO | 2007098560 | 9/2007 |
| WO | 1999022364 | 4/2014 |
| WO | 2014122416 | 4/2014 |
| WO | 2014122416 | 8/2014 |

OTHER PUBLICATIONS

Ren, et al., "Affective sports highlight detection", 15th European Signal Processing Conference, Sep. 3-7, 2007, pp. 728-732.

Isao Otsuka, et al., "A Highlight Scene Detection and Video Summarization System Using Audio Feature for a Personal Video Recorder", Consumer Electronics, IEEE Transactions on 51.1, Dec. 2005, pp. 112-116.

Changsheng Xu, et al., "Live Sports Even Detection Based on Broadcast Video and Web-casting Text", Proceedings of the 14th annual ACM international conference on Multimedia, ACM, 2006, pp. 221-230.

U.S. Appl. No. 14/754,584, filed Jun. 29, 2015, Michael Anthony Willette, et al.

U.S. Appl. No. 14/732,580, filed Jun. 5, 2015, Ethan Zane Evans, et al.

U.S. Appl. No. 14/732,582, filed Jun. 5, 2015, Ethan Zane Evans, et al.

U.S. Appl. No. 14/755,905, filed Jun. 30, 2015, Michael Anthony Willette et al.

U.S. Appl. No. 14/755,922, filed Jun. 30, 2015, David Hendrik Verfaillie et al.

U.S. Appl. No. 14/755,955, filed Jun. 30, 2015, Christopher Paul Dury et al.

U.S. Appl. No. 14/755,944, filed Jun. 30, 2015, Robert Harvey Oates.

U.S. Appl. No. 14/755,934, filed Jun. 30, 2015, Rohit Garg et al.

U.S. Appl. No. 14/755,967, filed Jun. 30, 2015, Patrick Gilmore et al.

U.S. Appl. No. 14/755,974, filed Jun. 30, 2015, Hok Peng Leung et al.

U.S. Appl. No. 14/318,093, filed Jun. 27, 2014, Michael Martin George.

U.S. Appl. No. 14/318,083, filed Jun. 27, 2014, Michael Martin George.

U.S. Appl. No. 14/318,117, filed Jun. 27, 2014, Michael Martin George.

U.S. Appl. No. 14/318,042, filed Jun. 27, 2014, Gerald Joseph Heinz et al.

Mehdi Kaytoue, et al. "Watch me playing, I am a professional: a first study on video game live streaming", Proceedings of the 21st international conference companion on World Wide Web, ACM, 2012, pp. 1-8.

Gifford Cheung, et al., "Starcraft from the stands: understanding the game spectator", Proceedings of the SIGCHI Conference on Human Factors in Computing Systems, ACM, 201, pp. 1-10.

Thomas P. B. Smith, et al."Live-streaming changes the (video) game." Proceedings of the 11th European conference on Interactive TV and video. ACM, 2013, pp. 131-138.

William A. Hamilton, et al., "Streaming on twitch: fostering participatory communities of play within live mixed media." Proceedings of the SIGCHI Conference on Human Factors in Computing Systems. ACM, 2014, pp. 1-10.

Amazon Web Services, 'Amazon AppStream Developer Guide', 2014, pp. 1-195.

Ben Medler, "Generations of Game Analytics, Achievements and High Scores", Eludamos Journal for Computer Game Culture, 2009, pp. 177-194, vol. 3, No. 2.

Wang, Jue, et al. "Interactive video cutout." ACM Transactions on Graphics (TOG). vol. 24. No. 3. ACM, 2005, pp. 585-594.

Smolic, Aljoscha, et al. "3d video and free viewpoint video-technologies, applications and mpeg standards." Multimedia and Expo, 2006 IEEE International Conference on. IEEE, 2006, pp. 1-56.

Karsten Muller, et al. "View synthesis for advanced 3D video systems." EURASIP Journal on Image and Video Processing 2008 (2009), pp. 1-11.

Ballan, Luca, et al. "Unstructured video-based rendering: Interactive exploration of casually captured videos." ACM Transactions on Graphics (TOG) 29.4 (2010): 87, pp. 1-10.

Smolic, Aljoscha, Hideaki Kimata, and Anthony Vetro. "Development of MPEG standards for 3D and free viewpoint video." Optics East 2005. International Society for Optics and Photonics, 2005, pp. 1-13.

Amazon Web Services, "Amazon AppStream Developer Guide", Nov. 13, 2013, pp. 1-200.

M.A. Anusuya, et al., "Speech Recognition by Machine: A Review", International Journal of Computer Science and Information Security, 2009, pp. 181-205, vol. 6, No. 3.

Frank Dellaert, et al., "Recgonizing Emotion in Speech", IEEE, Spoken Language, 1996, pp. 1-4 Proceedings., Fourth International Conference on vol. 3.

Santosh K. Gaikwad, et al., "A Review on Speech Recognition Technique", International Journal of Computer Applications, Nov. 2010, pp. 16-24, vol. 10, No. 3.

Kiel Mark Gilleade, et al., "Afftective Videogames and Modes of Affectived Gaming: Assist me, Challenge Me, Emote Me", Proceedings of DiGRA 2005 Conference, 2005, pp. 1-7.

Eva Hudlicka, "Affective Game Engines: Motivation and Requirements", Proceeding of the 4th International Conference on Foundations of Digital Games, ACM, Apr. 26-30, 2009, pp. 1-9, Orlando, Florida, USA.

Christian Martyn Jones, et al., "Creating an emotionally reactive computer game responding to affective cues in speech", HCI Proceedings, 2005, pp. 1-2, vol. 2.

Paul P.A.B. Merkx, et al., "Inducing and Measuring Emotion through a Multiplayer First-Person Shooter Computer Game", Proceedings of the Computer Games Workshop, 2007, pp. 1-12.

Alan Murphy, Dr. Sam Redfern. "Utilizing Bimodal Emotion Recognition for Adaptive Artificial Intelligence." International Journal

(56) References Cited

OTHER PUBLICATIONS of Engineering Science and Innovative Technology (IJESIT), Jul. 2013, pp. 167-173, vol. 2, Issue 4.
Bjorn Schuller, et al., "Acoustic Emotion Recognition: A Benchmark Comparison of Performances", IEEE, ASRU 2009, pp. 552-557.
Norman Makoto Su, et al., "Virtual Spectating: Hearing Beyond the Video Arcade", Proceedings of the 25th BCS conference on human-computer interaction. British Computer Society, 2011, pp. 269-278.
Thurid Vogt, et al., "Automatic Recognition of Emotions from Speech: A Review of the Literature and Recommendations for Practical Realisation", . Affect and emotion in HCI, LNCS 4868, Springer Berlin Heidelberg, 2008, pp. 75-91.
Greg Wadley, et al., "Towards a Framework for Designing Speech-Based Player Interaction in Multiplayer Online Games", Proceedings of the second Australasian conference on Interactive entertainment. Creativity & Cognition Studios Press, 2005, pp. 1-4.

* cited by examiner ers. The continued evolution and growth of online gaming has
DETERMINING HIGHLIGHTS IN A GAME SPECTATING SYSTEM

BACKGROUND

Evolution of the Internet, Web-based computing, and mobile computing, including the increasingly widespread availability of broadband connections, support for high-resolution video, and the availability and capabilities of consumer computing devices including but not limited to mobile computing devices such as pad/tablet devices and smartphones, has led to continuing evolution and growth of online gaming. Online games may include everything from relatively simple, two-dimensional (2D) casual games to more complex 2D or three-dimensional (3D) action, sports, or strategy games that may involve one or more players in a game session, to multiplayer online battle arena (MOBA) games, to world-building multiplayer games, to complex 3D massively multiplayer online games (MMOGs) such as massively multiplayer online role-playing games (MMORPGs) that may support hundreds or thousands of active players in a persistent online "world".

The continued evolution and growth of online gaming has in turn led to the rise in popularity of video game spectating, or virtual spectating. In virtual spectating, one or more spectators may watch the game play of one or more other players actively participating in an online game without themselves actively participating in the game play. For example, in a multiplayer online game, spectators may watch one or more players or teams of players involved in a battle or otherwise participating in game play. Broadband Internet, high-resolution video, and video streaming technologies have led to the development of live broadcasting technologies that may be leveraged to provide online virtual spectating for online games. For example, a game spectating system may allow players to broadcast live or recorded streams of their game play to tens, hundreds, or thousands of spectators, while allowing the spectators to select the live or recorded broadcasts of particular players for viewing.

Figure 1:
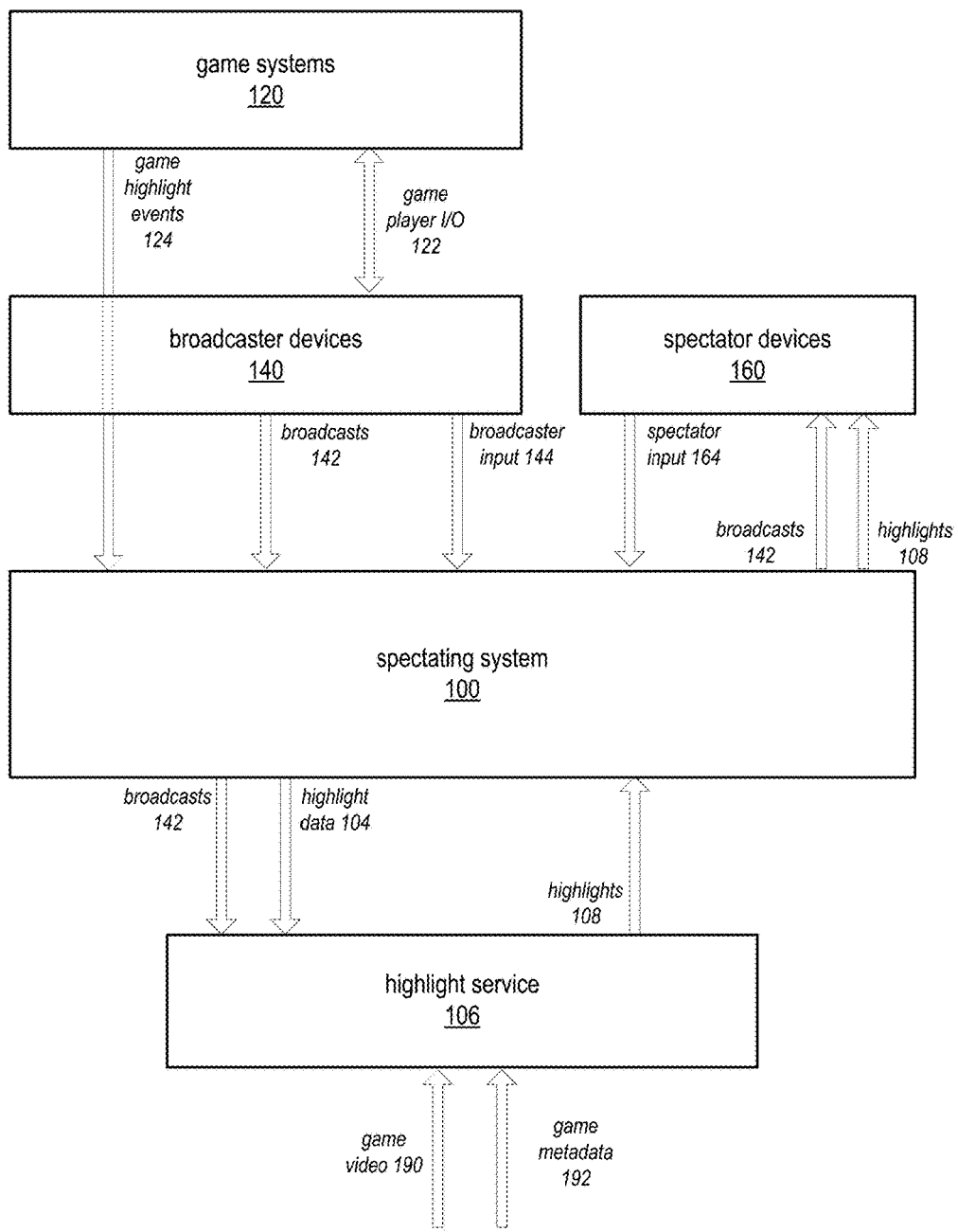
FIG. 1 is a high-level block diagram that illustrates determining and presenting highlights in a game spectating environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for determining and presenting events and highlights from streamed content in a game spectating environment are described. In a game spectating environment, a game spectating system may receive broadcasts of players' game play from broadcaster devices and stream the broadcasts to spectator devices for viewing by respective spectators. Each broadcast includes video showing game play of a respective broadcaster participating as a player in a game executing on a game system. Each broadcast and/or game may include highlights. The highlights may include unusual, unlikely or uncommon events, or otherwise interesting or notable events. Embodiments of a highlight component, module, or service for a game spectating environment are described that obtains highlight data indicating notable events in the broadcasts and/or games executing on the game systems and determines highlight segments from the broadcasts according to the highlight data. Each highlight segment includes an interesting or notable event from the respective game as determined according to highlight data for the game. The highlight service may determine sets or "reels" of highlights from the plurality of highlight segments according to one or more highlight selection criteria such as game genres, game titles, player/broadcasters, time periods, types of highlights (e.g., types of plays), and so on. The highlight service may provide access to the highlights via a highlight user interface (UI) presented to the spectators on respective spectator devices. The spectators may selectively view the highlights or highlight reels via the highlight UI. In some embodiments, particular or targeted highlight sets or reels (e.g., highlights from particular genres, games, etc.) may be provided to particular spectators via the highlight UI based on spectators' specified or otherwise determined preferences.

Game spectating systems may include network-based video streaming systems that may allow game players to broadcast live streams of their game play to tens, hundreds, thousands or more spectators, while allowing the spectators to select the broadcasts of particular players for viewing. A game spectating system may support live streaming of broadcast from tens, hundreds, or thousands of players simultaneously. A game spectating system may record at least some live broadcasts and allow the recorded broadcasts to be played back for viewing by spectators. A game spectating system may support live and recorded broadcasts for one, two, or more different online games.

Online games are network-based games that may allow one, two, or more players, in some cases even thousands of players, to simultaneously participate in a game from consumer devices coupled to a network. Online games that may be implemented in game spectating environments as described herein may vary from tightly scripted games to games that introduce varying amounts of randomness to the game play. An online game may, for example, be a game in which the players attempt to achieve some goal or overcome some obstacle, and may include multiple levels that the players have to overcome. An online game may, for example, be a game in which the players cooperate to achieve goals or overcome obstacles, or a game in which one or more of the players compete against one or more other players, either as teams or as individuals. Alternatively, an online game may be a game in which the players may more passively explore and make discoveries within a complex game universe without any particular goals in mind, or a "world-building" online game in which the players may actively modify their environments within the game universe. Online games may include everything from relatively simple, two-dimensional (2D) casual games to more complex 2D or three-dimensional (3D) action, sports, or strategy games, to multiplayer online battle arena (MOBA) games, to complex 3D massively multiplayer online games (MMOGs) such as massively multiplayer online role-playing games (MMORPGs) that may simultaneously support hundreds or thousands of players in a persistent online "world".

In this document, the term "player" is generally used to refer to an actual human that actively participates in an online game, the term "broadcaster" is generally used to refer to a player that broadcasts a stream of their game play via the game spectating system, the term "spectator" is generally used to refer to an actual human that watches live or recorded game play online without directly participating in the game as a player, the term "participant" is generally used to collectively refer to players (active participants) and spectators (passive participants), the term "client" (as in "client device", "game client", "broadcasting client", and "spectating client") is generally used to refer to a hardware and/or software interface to a game system or streaming system via which a participant interacts with the game system and/or spectating system, and the term "character" or "game character" is generally used to refer to a player's in-game presence or "avatar" that the player may control via a game client on a client device to interact with other game characters, other game entities, and other objects within the game environment during a game session.

While embodiments are primarily described herein in the context of determining and presenting highlights from broadcasts in multiplayer online gaming environments in which two or more players remotely participate in online game sessions, it is to be noted that embodiments may also be applied to determine and present highlights in single-player online games, as well as in single-player and multi-player games that are not necessarily online, such as single-player and multiplayer console games that may be played locally/offline. In addition, in some embodiments, a spectating system may support broadcasts or streams of live and/or recorded digital media content from sources other than game systems, for example from live sports games, competitions, concerts, talk shows, and other events including but not limited to live streams from electronic spectator sports (eSports) competitions, and embodiments may also be applied to determine and present highlights for these broadcasts or streams. Further, while embodiments are primarily described in the context of determining and presenting highlights from live streams or video, embodiments may also be applied to determine and present highlights from previously recorded streams or video. More generally, embodiments may be applied to determine and present highlights for video inputs or streams from any video source.

FIG. 1 is a high-level block diagram that illustrates determining and presenting highlights in a game spectating environment, according to at least some embodiments. A game spectating environment may include a spectating system 100, one or more game systems 120, and multiple client devices; the client devices may include broadcaster devices 140 and spectator devices 160. Each broadcaster device 140 may include, but is not limited to, input and output components and game client software for at least one game system 120 via which respective players can participate in game sessions currently being executed by the game system(s) 120. Each broadcaster device 140 may also include input and output components (e.g., video cameras and microphones) and broadcasting client software for the spectating system 100 via which respective players may generate live A/V streams of their online game play (broadcasts 142) and other input 144 including but not limited to audio and textual commentary for broadcasting to spectators via the game spectating system 100. Each spectator device 160 may include, but is not limited to, input and output components and spectating client software via which respective spectators may interact with the spectating system 100 to select, receive, and view live broadcasts 142 from the broadcasters or playbacks of previously recorded broadcasts 142, and via which the spectators may provide spectator input 164 including but not limited to feedback (e.g. audio or textual commentary) for broadcasts 142 and inputs selecting or specifying broadcasts 142, highlights 108, or other content offered via the spectating system 100.

Spectating system 100 may be a network-based video streaming system that may allow players to broadcast live streams 142 of their online game play to tens, hundreds, thousands or more spectators, while allowing the spectators to select the broadcasts 142 of particular players (also referred to as channels) for viewing. A spectating system 100 may support live broadcasts 142 for one, two, or more different game systems 120, and may support live streaming of broadcasts 142 from tens, hundreds, or thousands of broadcaster devices 140 to the spectator devices 160. In some embodiments, a spectating system 100 may record at least some broadcasts 142 and allow the recorded broadcasts 142 to be played back to spectator devices 160 for viewing by spectators. A game spectating system 100 may support live and recorded broadcasts 142 for one, two, or more different online games 120.

While FIG. 1 shows game systems 120 as separate from spectating system 100, in some embodiments, at least one game system 120 may be implemented at least in part by spectating system 100. In some embodiments, one or more broadcaster devices 140 may be implemented within spectating system 100.

In some embodiments, a spectating system 100 may support broadcasts 142 of live and/or recorded digital media content via broadcaster devices 140 from sources other than game systems 120. For example, in some embodiments, the spectating system 100 may support live or recorded broadcasts of streams from sports games, competitions, concerts, and other events including but not limited to live streams from electronic spectator sports (eSports) competitions. eSports (also referred to as competitive gaming) generally refers to organized multiplayer video game competitions.

The game spectating environment may also include a highlight component, module or service 106. In some embodiments, a highlight service 106 may include or be implemented by one or more computing devices, for example one or more server devices, that implement the highlight service functionality and that may provide one or more application programming interfaces (APIs) to and user interfaces (UIs) for the highlight service functionality. Highlight service 106 may also include or access other devices including but not limited to storage devices or systems for storing highlights and highlight reels, and that may also be used to store other data and information used by the highlight service 106 such as highlight information including but not limited to spectator highlight preferences. In some embodiments, highlight service 106 may be implemented separately from spectating system 100, for example as a network-based service that is accessible by one or more entities including but not limited to spectating system 100. In some embodiments, highlight service 106 may instead be implemented as a component, module, or subsystem of spectating system 100. FIGS. 4A through 4F and FIG. 5 illustrate components and operations of an example highlight service 106 in more detail, according to some embodiments.

Figure 2A:
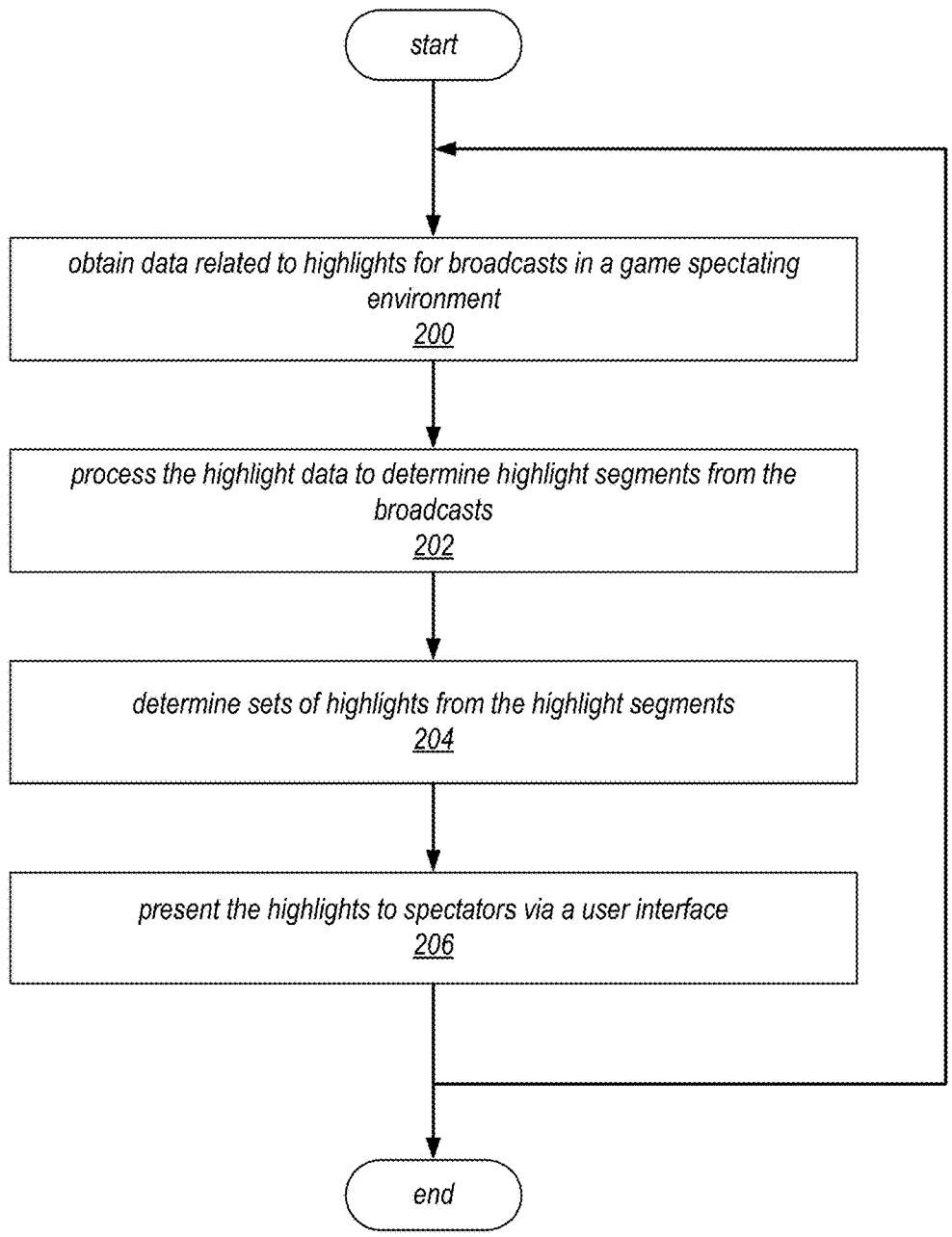
FIG. 2A is a high-level flowchart of a method for determining and presenting highlights from broadcasts in a game spectating environment, according to at least some embodiments.

FIG. 2A is a high-level flowchart of a method for determining and presenting highlights in a game spectating environment, according to at least some embodiments. The method of FIG. 2A may, for example, be implemented by a highlight component, module, or service in a game spectating environment as illustrated in FIG. 1.

As indicated at 200 of FIG. 2A, data related to highlights for broadcasts in a game spectating environment may be obtained. Referring to FIG. 1, spectating system 100 may receive broadcasts 142 of players' game play from broadcaster devices 140 and stream the broadcasts 142 to spectator devices 160 for viewing by respective spectators. Each broadcast 142 includes video showing game play of a respective broadcaster participating as a player in a game executing on a game system 120. In some embodiments, highlight service 106 obtains highlight data 104 indicating interesting and/or notable events ("highlights") in the broadcasts 142 and/or games executing on the game systems 120.

As indicated at 202 of FIG. 2A, the highlight data may be processed to determine highlight segments from the broadcasts. Referring to FIG. 1, in some embodiments, the highlight service 106 determines highlight segments from the broadcasts 142 according to the highlight data 104. Each highlight segment includes an interesting or notable event (a "highlight") from the respective game and/or broadcast 142 as determined according to highlight data 104 for the game and/or broadcast 142.

The following provides several non-limiting examples of methods for receiving 200 and processing 210 highlight data 104 in a spectating system 100 to determine highlight segments from broadcasts. Note that these examples of highlight data and of methods for obtaining and processing the highlight data are not intended to be limiting, and may be used alone or in combination.

Figure 4A:
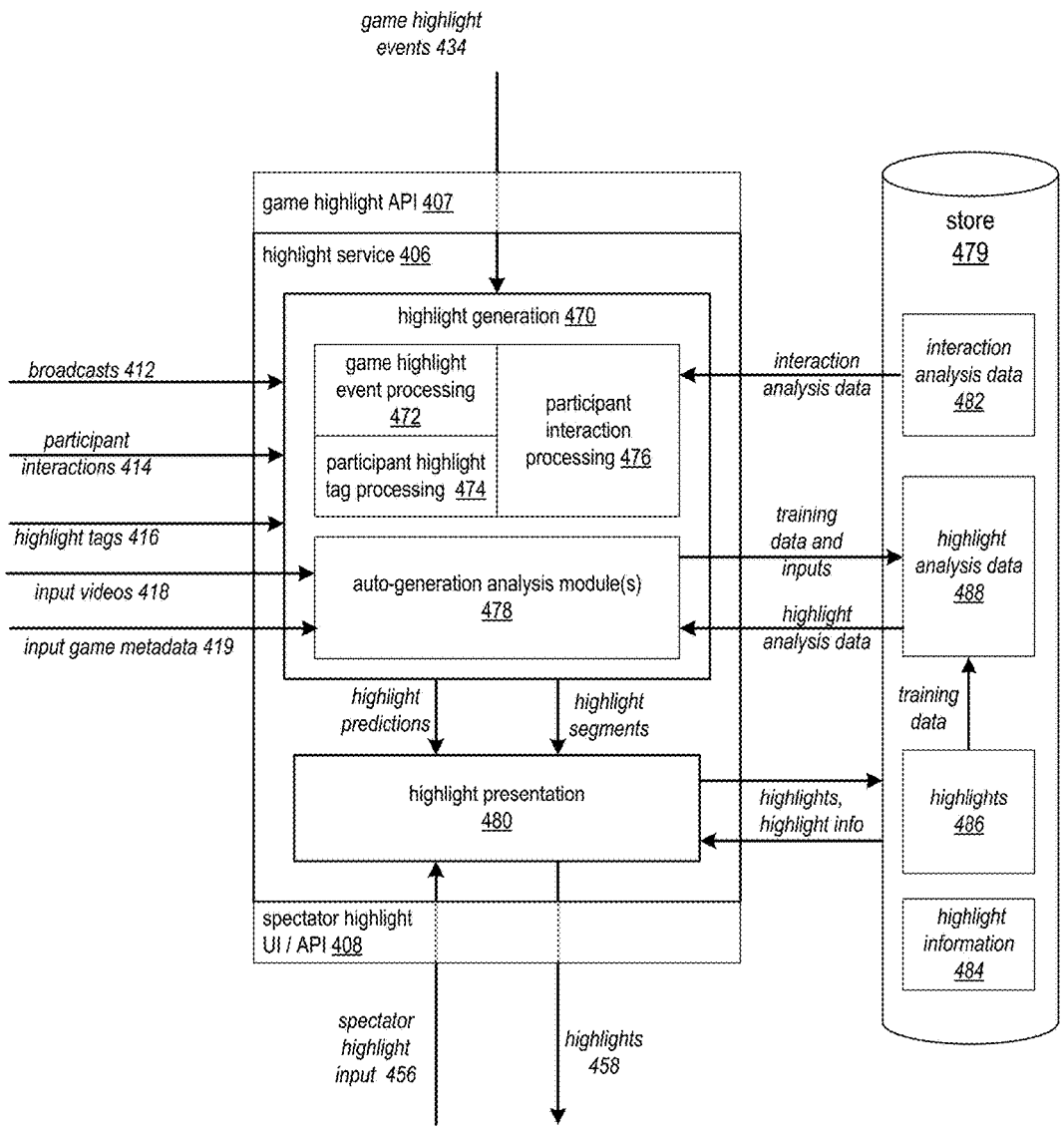
FIG. 4A illustrates components and operations of a highlight service in a game spectating system, according to at least some embodiments.
Figure 4B:
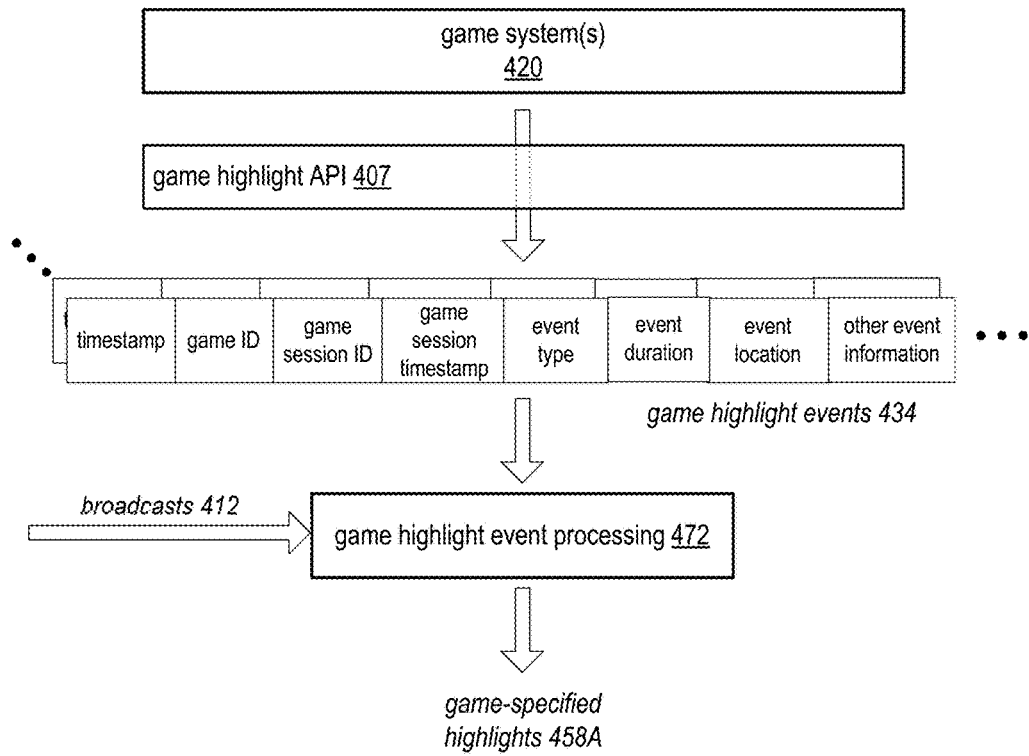
FIG. 4B illustrates game highlight event processing to determine highlights in a game spectating system, according to at least some embodiments.

In some embodiments, the highlight data 104 may include game highlight events 124 received from the game systems 120 that indicate game-specific, in-game highlights as defined by the game systems 120. In some embodiments, the game highlight events 124 may be received according to an API to the highlight service 106. FIGS. 4A and 4B illustrate receiving and processing game highlight events 124 to determine highlights in broadcasts, according to at least some embodiments.

Figure 4C:
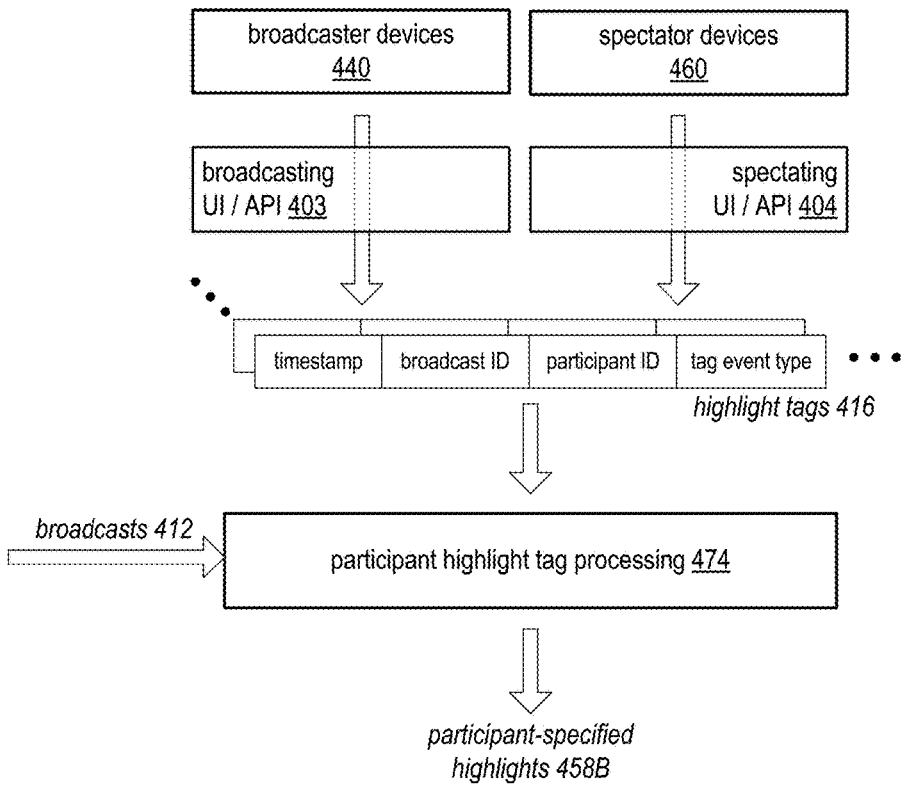
FIG. 4C illustrates participant highlight tag processing to determine highlights in a game spectating system, according to at least some embodiments.

In some embodiments, the highlight data 104 may instead or in addition include spectators' inputs to a spectator user interface on spectator devices 160, the spectators' inputs marking or tagging interesting or notable events (highlights) in broadcasts 142 being viewed by the spectators. In some embodiments, the highlight data 104 may instead or in addition include broadcasters' inputs to a broadcaster user interface on broadcaster devices 140, the broadcasters' inputs marking or tagging interesting or notable events in their broadcasts 142. FIGS. 4A and 4C illustrate receiving and processing participants' highlight tagging inputs to a spectating system 100 to determine highlights in broadcasts, according to at least some embodiments.

Figure 4D:
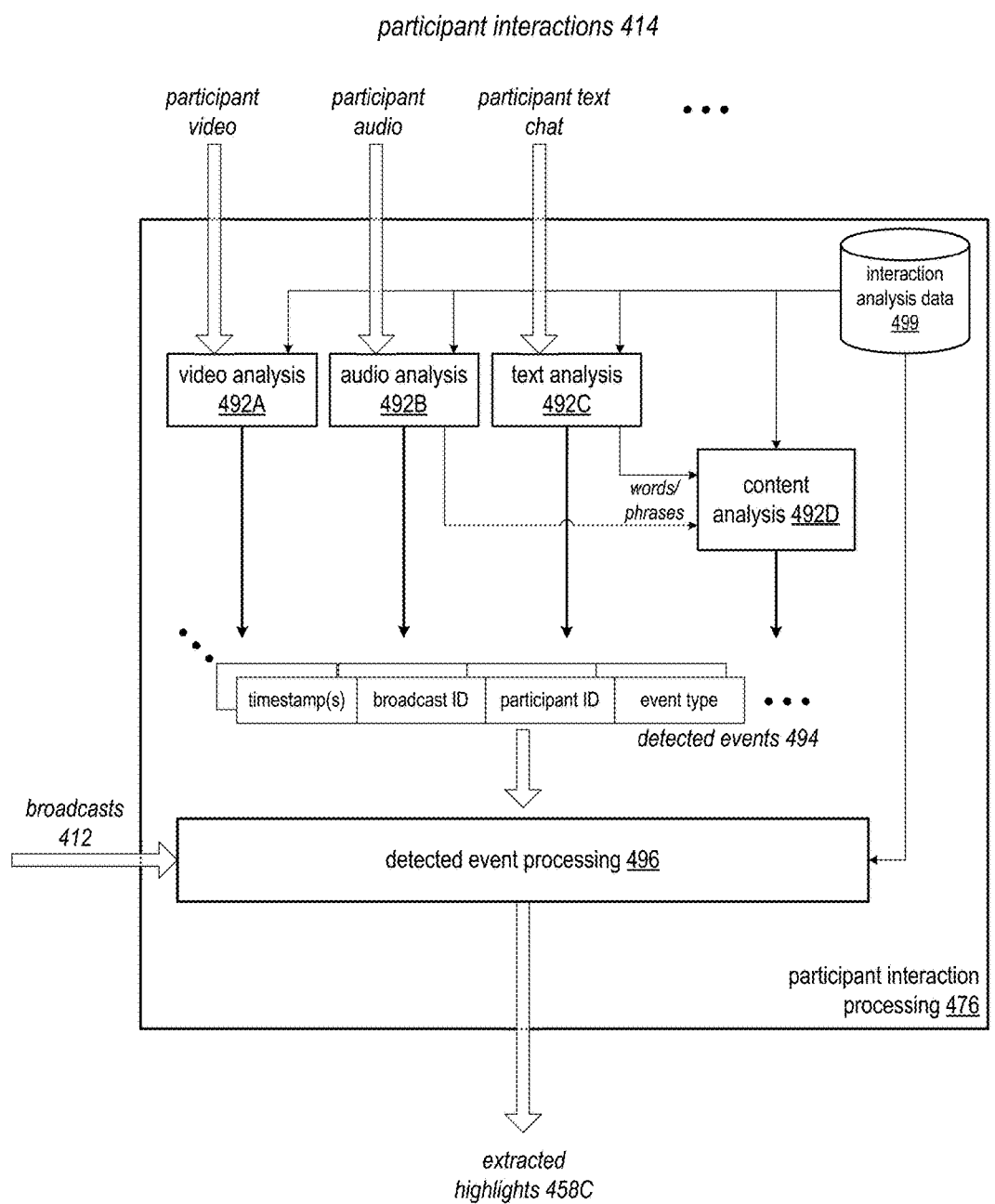
FIG. 4D illustrates participant interaction processing to determine highlights in a game spectating system, according to at least some embodiments.

In some embodiments, the highlight data 104 may instead or in addition include participant (broadcaster and/or spectator) audio and/or textual input and interactions with the spectating system 100 (e.g., broadcaster commentary, in-game voice or text chat, broadcast text chat, spectator vocal comments, crowd noise, etc.). The audio and/or textual interactions may be analyzed using various voice and speech analysis techniques to determine keywords, excitement levels, stress, and other metrics that may be used in identifying highlights in respective broadcasts 142. In some embodiments, the highlight data 104 may instead or in addition include video of participants (broadcasters and/or spectators) during a broadcast 142. The video input may be analyzed, for example using techniques that detect emotions via analysis of facial expressions, to determine metrics that may be used in identifying highlights in respective broadcasts 142. FIGS. 4A and 4D illustrate receiving and processing participant interactions with a spectating system 100 to determine highlights in broadcasts, according to at least some embodiments.

Figure 5:
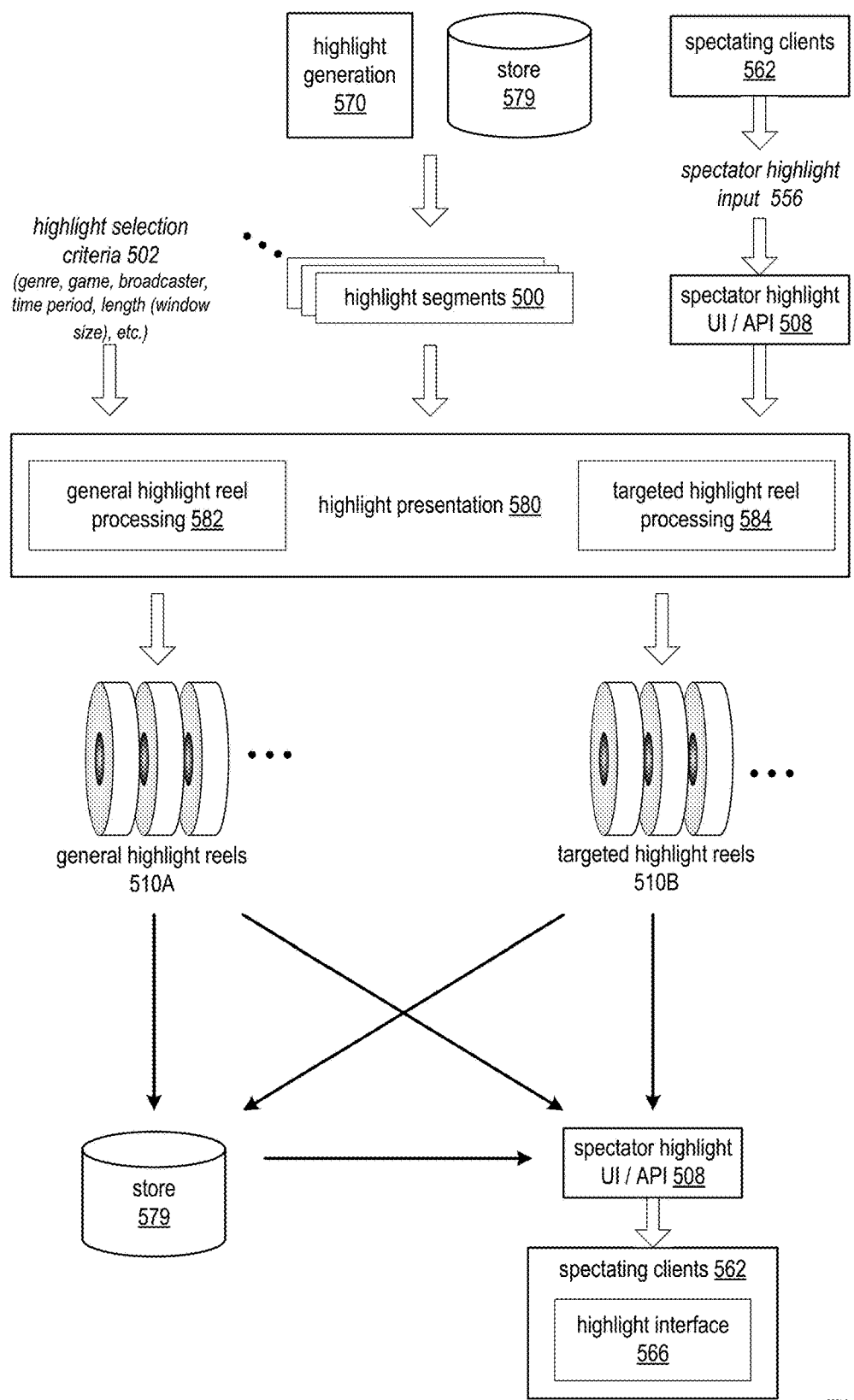
FIG. 5 illustrates a highlight presentation component for a highlight service, according to at least some embodiments.

As indicated at 204 of FIG. 2A, sets of highlights may be determined from the highlight segments. Referring to FIG. 1, in some embodiments, the highlight service 106 may determine sets or "reels" of highlights 108 from the highlight segments according to one or more highlight selection criteria such as game genres, game titles, player/broadcasters, time periods, and so on. In some embodiments, sets of highlights tailored to particular spectators may be determined according to the spectators' specified or otherwise determined preferences. FIG. 5 illustrates a highlight presentation component for a highlight service, according to at least some embodiments.

Figure 7:
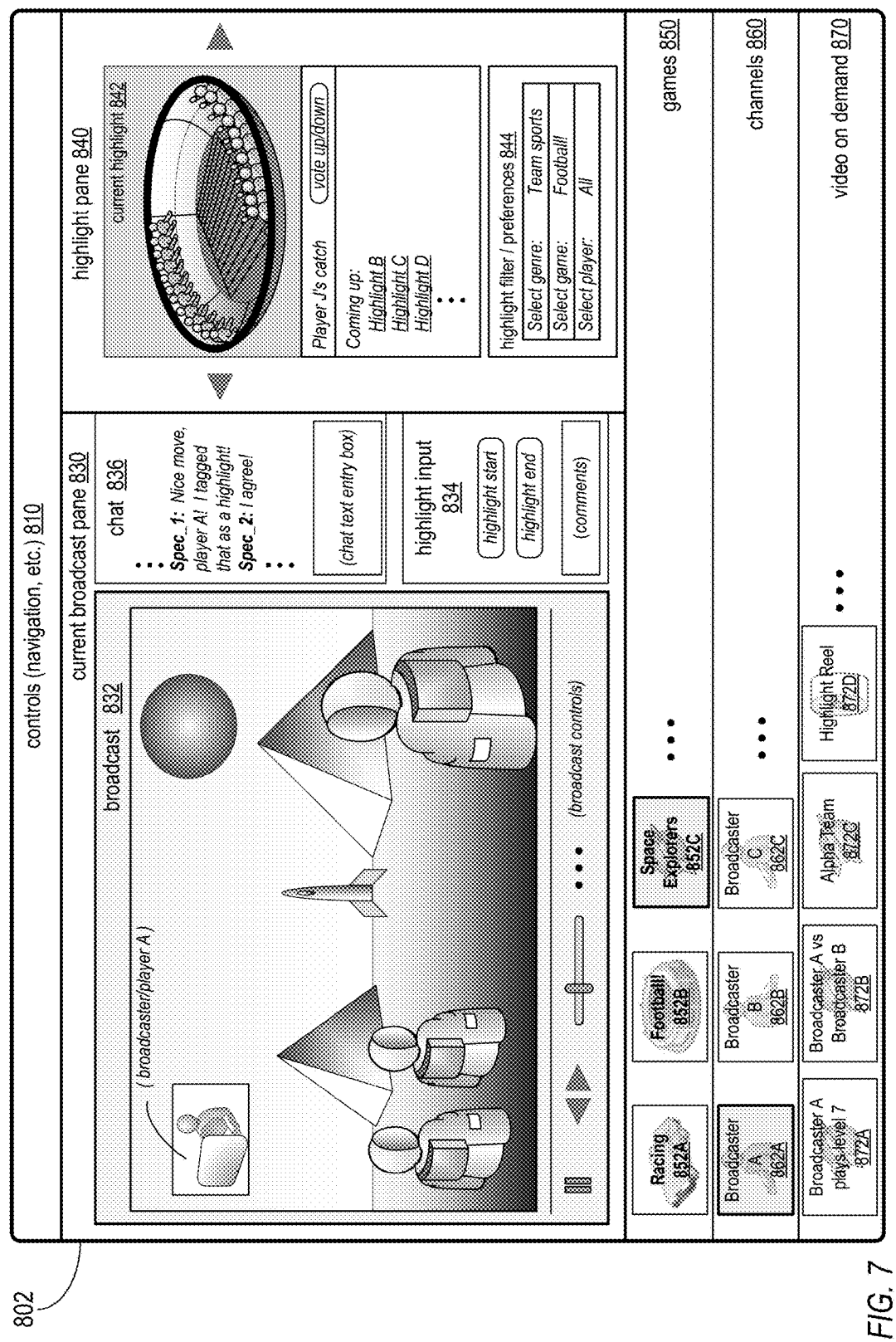
FIG. 7 provides a non-limiting example of a spectating user interface for a game spectating system that includes highlight user interface elements, according to some embodiments.
Figure 8:
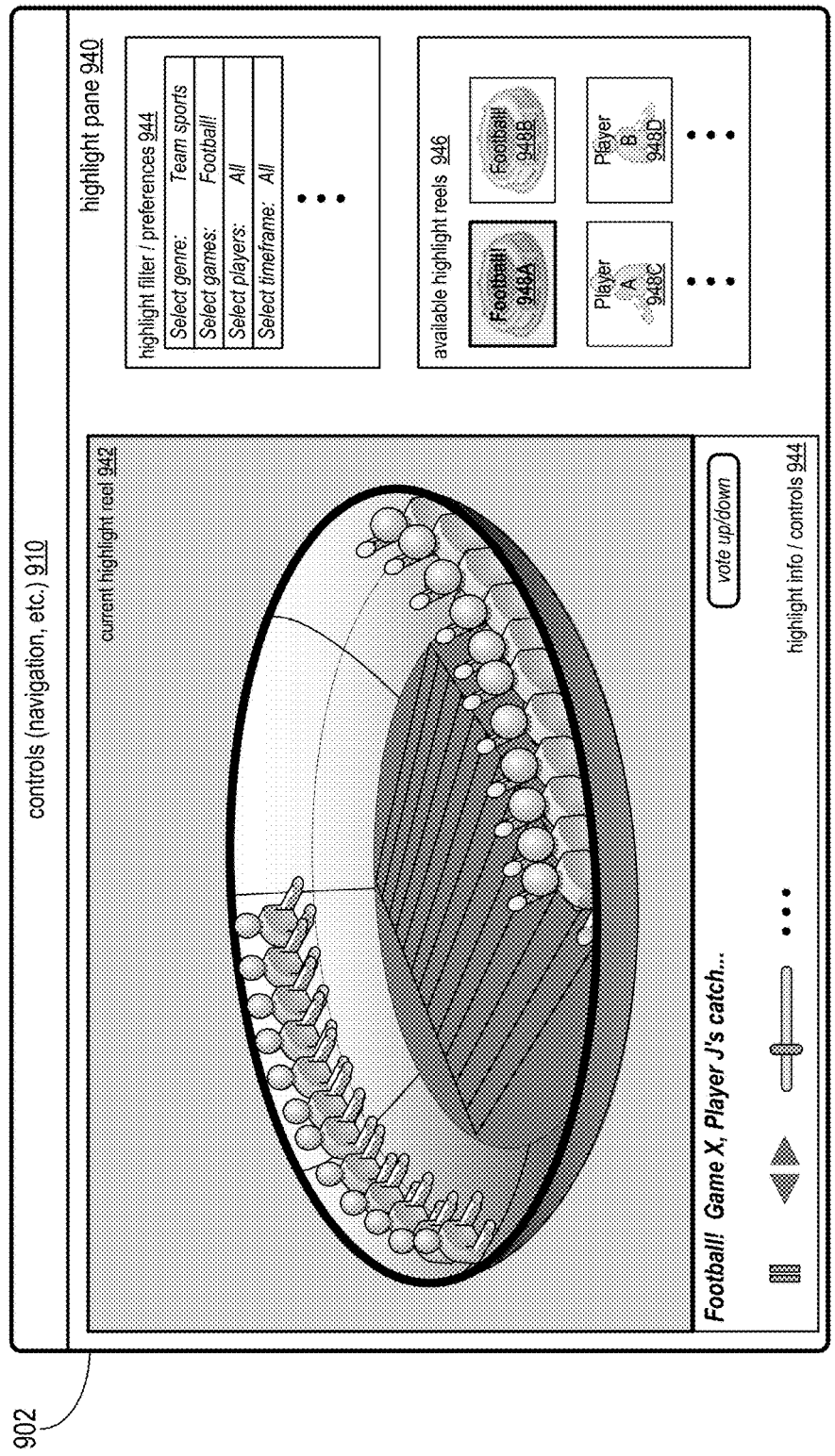
FIG. 8 provides a non-limiting example of a highlight user interface for a game spectating system, according to some embodiments.
Figure 10:
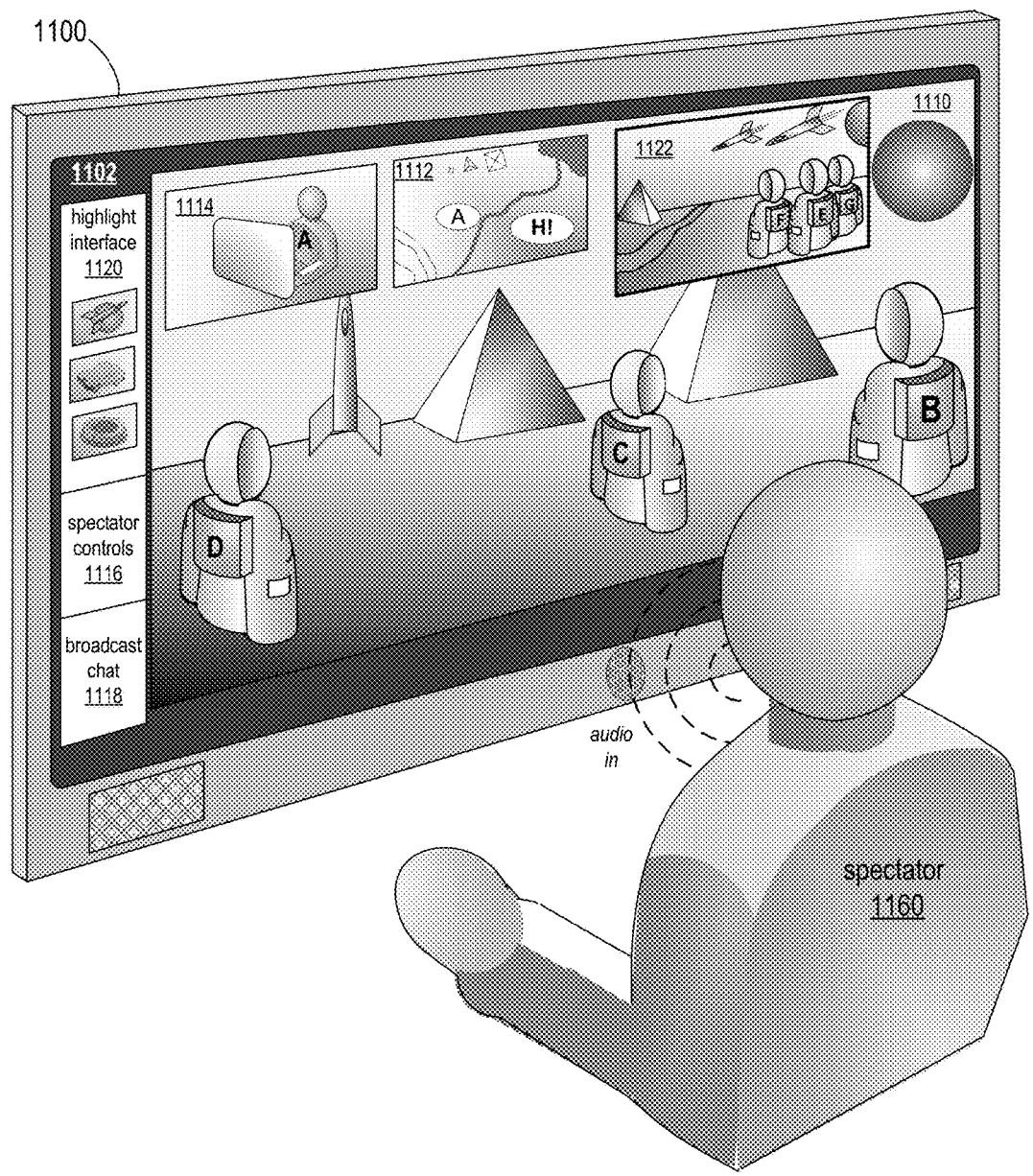
FIG. 10 provides another non-limiting example of a spectating user interface for a game spectating system, according to some embodiments.

As indicated at 206 of FIG. 2A, the highlights may be presented to spectators via a user interface. Referring to FIG. 1, in some embodiments, the highlight service 106 may provide access to the highlights 108 via a highlight user interface (UI) presented to the spectators on respective spectator devices 160. The spectators may then selectively view specific highlights 108 via the highlight UI. In some embodiments, particular sets or "reels" of highlights 108 (e.g., highlights 108 from particular genres, games, etc.) may be provided to particular spectators via the highlight UI based on the spectators' specified or otherwise determined highlight viewing preferences. FIGS. 7, 8, and 10 provide non-limiting examples of highlight UIs that may be used in spectating systems 100, according to some embodiments.

Figure 2B:
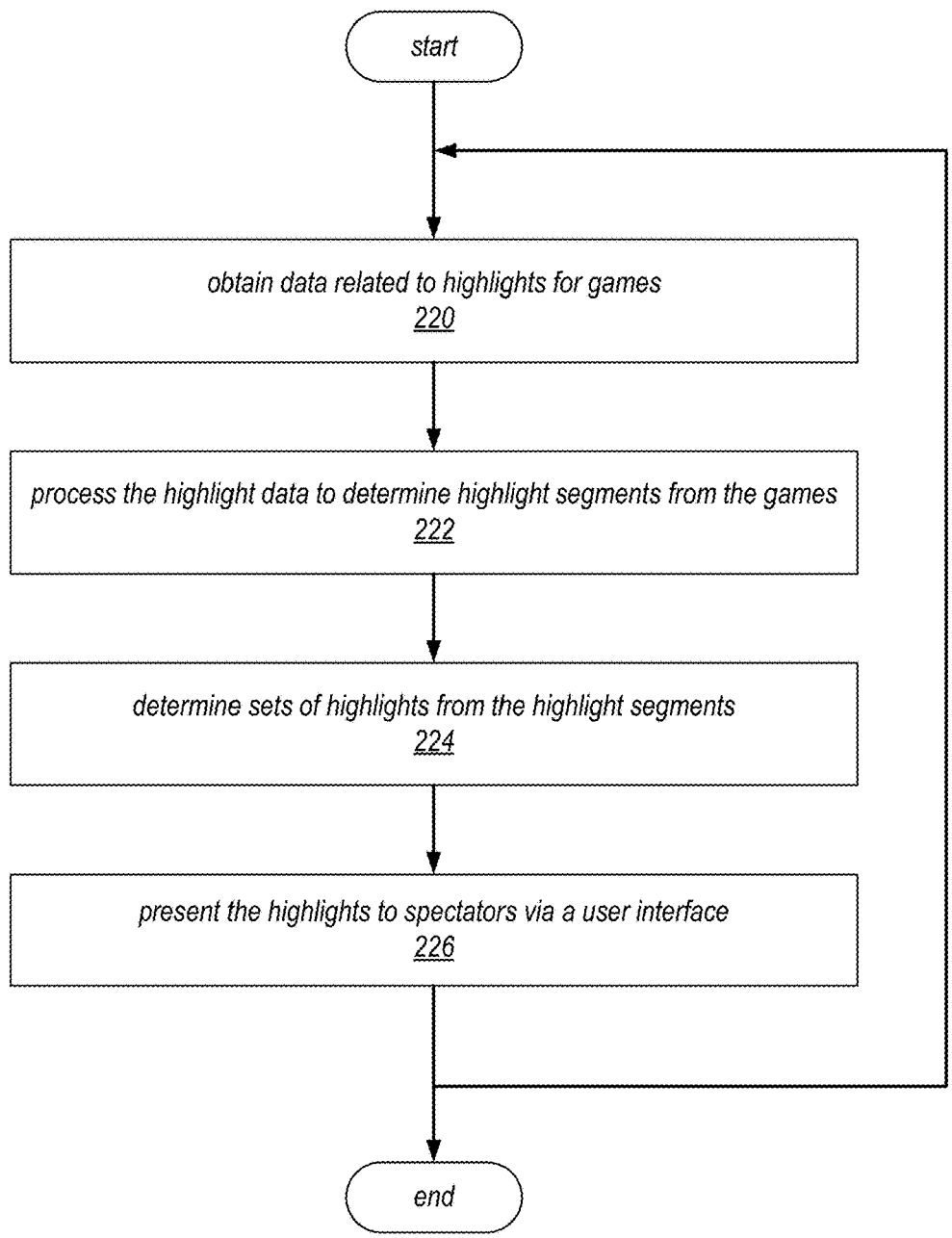
FIG. 2B is a high-level flowchart of a method for determining and presenting highlights from games that are not necessarily broadcast, according to at least some embodiments.

FIG. 2A shows a method for determining and presenting highlights from broadcasts in a game spectating environment. However, in some embodiments, highlights may be determined from games that are not necessarily broadcast, and the highlights may be presented to viewers via the game spectating system. FIG. 2B is a high-level flowchart of a method for determining and presenting highlights from games that are not necessarily broadcast, according to at least some embodiments. The method of FIG. 2B may, for example, be implemented by a highlight component, module, or service 106 as illustrated in FIG. 1.

As indicated at 220 of FIG. 2B, data related to highlights for games may be obtained. Referring to FIG. 1, in some embodiments, highlight service 106 may obtain game video 190 and game data 192 from games executing on game systems 120 or client devices that are not necessarily being broadcast. The game metadata 192 may include, but is not limited to, indications of game events, player performance metrics and statistics, and other game-related information as defined and detected by respective game systems, or as obtained from other sources. As indicated at 222 of FIG. 2B, the game video 190 and game data 192 may be processed to determine highlight segments from the game video 190. Referring to FIG. 1, in some embodiments, the highlight service 106 determines highlight segments from the game video 190 according to at least the game data 192. Each highlight segment includes an interesting or notable event (a "highlight") from the respective game video 190 as determined according to at least the game data 192. As indicated at 224 of FIG. 2B, sets of highlights may be determined from the highlight segments. Referring to FIG. 1, in some embodiments, the highlight service 106 may determine sets or "reels" of highlights 108 from the highlight segments according to one or more highlight selection criteria such as game genres, game titles, player, time periods, and so on. In some embodiments, sets of highlights tailored to particular spectators may be determined according to the spectators' specified or otherwise determined preferences. FIG. 5 illustrates a highlight presentation component for a highlight service, according to at least some embodiments. As indicated at 226 of FIG. 2B, the highlights may be presented to viewers via a user interface. For example, in some embodiments, the highlight service 106 may provide access to the highlights 108 via a highlight UI presented to viewers on respective spectator devices 160 as illustrated in FIG. 1. The viewers may then selectively view specific highlights 108 via the highlight UI. In some embodiments, particular sets or "reels" of highlights 108 (e.g., highlights 108 from particular genres, games, etc.) may be provided to particular viewers via the highlight UI based on the viewers' specified or otherwise determined highlight viewing preferences. FIGS. 7, 8, and 10 provide non-limiting examples of highlight UIs that may be used, according to some embodiments.

Figure 3:
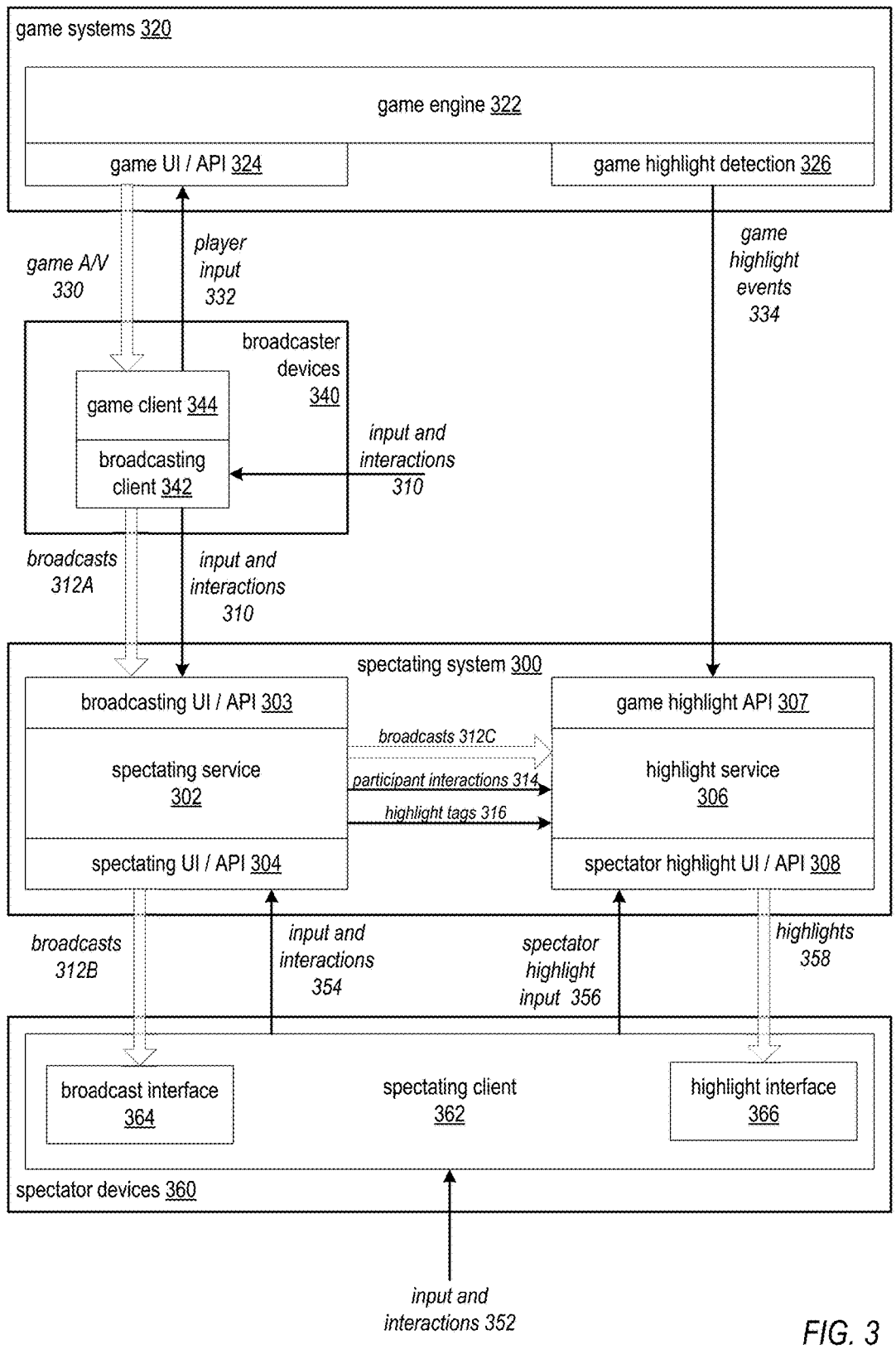
FIG. 3 illustrates a game spectating system that determines highlights for broadcasts and presents the determined highlights to spectators, according to at least some embodiments.

FIG. 3 illustrates a game spectating system that includes a highlight service that determines highlights for broadcasts and presents the determined highlights to spectators, according to at least some embodiments. FIG. 3 shows a game spectating system and environment as illustrated in FIG. 1 in more detail. A game spectating environment may include a spectating system 300, one or more game systems 320 that each serve as an execution environment for an online game, and multiple client devices; the client devices may include broadcaster devices 340 and spectator devices 360. The game spectating system 320 may include or have access to a spectating module or service 302 and a highlight module or service 306.

In at least some embodiments, game spectating system 300 may be a network-based video streaming system that may allow players to broadcast live streams of their online game play to tens, hundreds, or thousands of spectators, while allowing the spectators to select the broadcasts of particular players (also referred to as channels) for viewing via spectating client 362 software on the spectator devices 360. A spectating system 300 may support live broadcasts for one, two, or more different game systems 320, and may support live streaming of broadcasts from tens, hundreds, or thousands of broadcaster devices 340 to tens, hundreds, or thousands of spectator devices 360. In some embodiments, game spectating system 300 may include one or more servers that implement a spectating service 302 that supports live streaming of broadcasts received from many broadcaster devices 340 to many spectator devices 360. In some embodiments, game spectating system 300 may also include other devices including but not limited to storage devices that store data including but not limited to recordings of broadcasts and participant (spectator and broadcaster) information including but not limited to participant profile information. Game spectating system 300 may store recordings of at least some broadcasts 312 to a data store, and may allow spectators to select and play back the recordings via spectating client 362 software on the spectator devices 360. A game spectating system 300 may also implement one or more user interfaces (UIs) and one or more APIs to the game spectating system functionality. For example, a game spectating system 300 may implement a broadcasting UI/API 303 to the spectating service 302 that broadcasters may access via broadcasting clients 342 to broadcast their live game play and other A/V input as a live stream, and via which the broadcasters may provide audio or textual commentary or chat for broadcasts 312 or other inputs to the spectating system 300. As another example, a game spectating system 300 may implement a spectating UI/API 304 to the spectating service 302 that spectators may access via spectating clients 362 to select, receive, and view live broadcasts 312 from the broadcasters or playbacks of previously recorded broadcasts 312, and via which the spectators may provide spectator feedback and other input (e.g.

audio or textual commentary or chat) for broadcasts 312 or other inputs to the spectating system 300.

Figure 11:
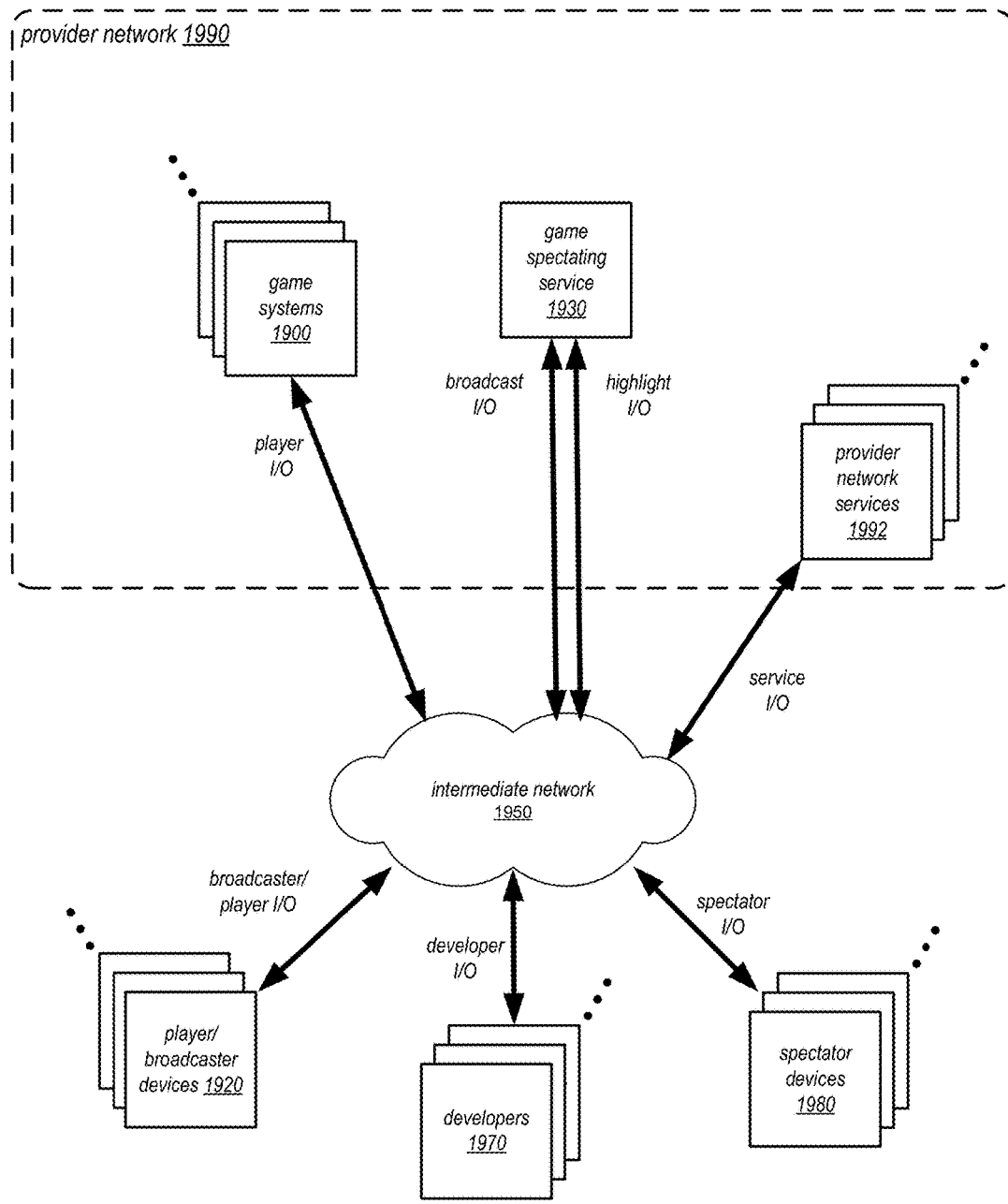
FIG. 11 illustrates an example network-based game spectating environment, according to at least some embodiments.

In some embodiments, at least some components of a game spectating environment may be implemented in the context of a service provider that provides virtualized resources on a provider network to clients of the service provider, for example as illustrated in FIG. 11. For example, a spectating component or service 302 of a spectating system 300 and/or a highlight component or service 306 of a spectating system 300 may be implemented as services on a provider network as illustrated in FIG. 11. In some embodiments, one or more game systems 320 may be implemented by game providers on the provider network. While FIG. 3 shows game systems 320 as separate from spectating system 300, in some embodiments, at least one game system 320 may be implemented at least in part by spectating system 300.

Figure 12:
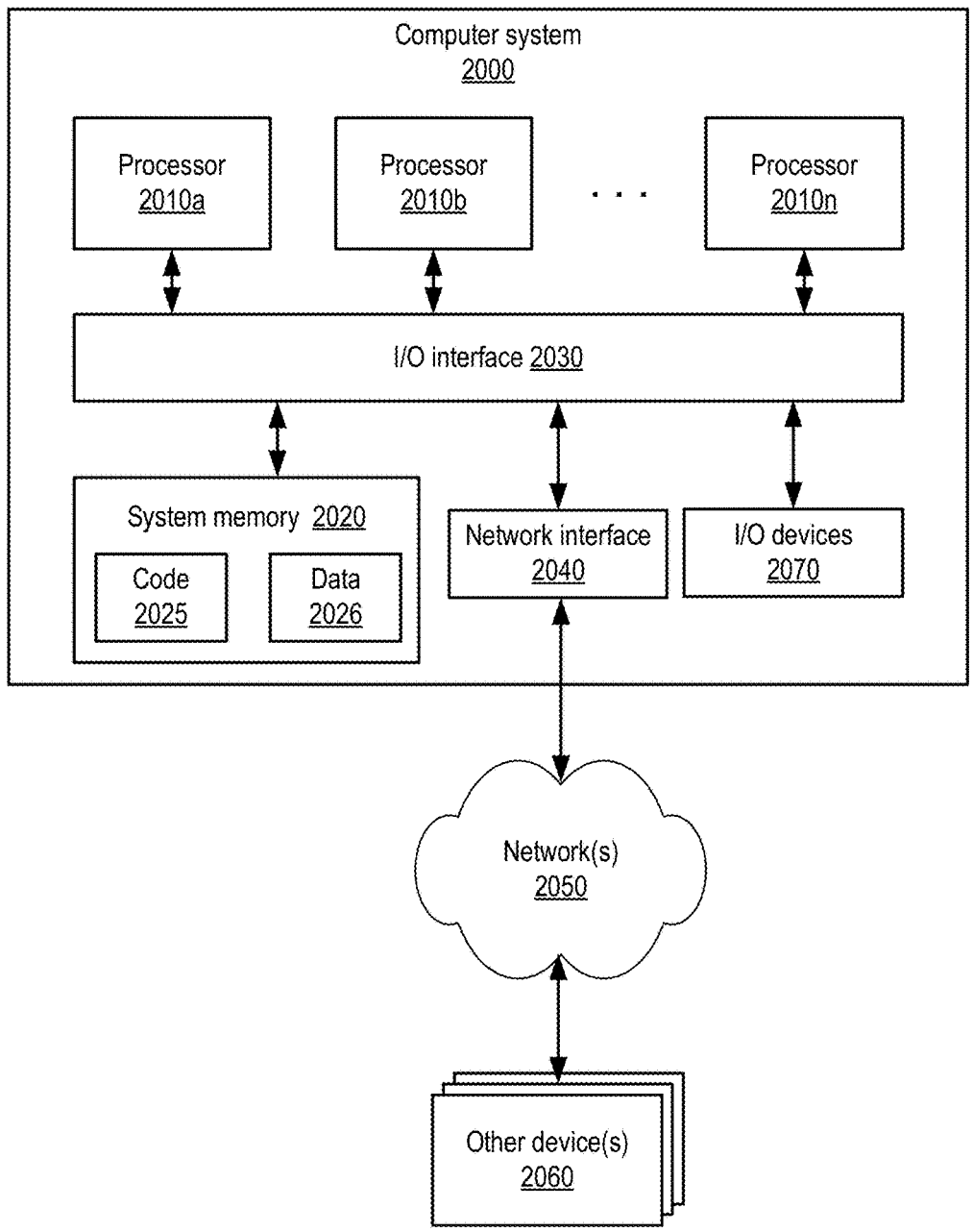
FIG. 12 is a block diagram illustrating an example computer system that may be used in some embodiments.

Broadcaster devices 340 and spectator devices 360 may be referred to as client devices in the game spectating environment. A client device (a broadcaster or spectator device) may be any of a variety of consumer devices including but not limited to desktop computer systems, laptop/notebook computer systems, pad/tablet devices, smartphone devices, game consoles, handheld gaming devices, and wearable devices. Thus, client devices may range from powerful desktop computers configured as gaming systems down to "thin" mobile devices such as smartphones, pad/tablet devices, and wearable devices. Each client device may implement an operating system (OS) platform that is compatible with the device. A client device may include, but is not limited to, input and output components and client software. The client software on a particular client device may be tailored to support the configuration and capabilities of the particular device type and the OS platform of the device. An example computing device that may be used as a client device is illustrated in FIG. 12.

Each broadcaster device 340 may include, but is not limited to, input and output components and game client 344 software for at least one game system 320 via which respective players can participate in game sessions currently being executed by the game system(s) 320. Each broadcaster device 340 may also include input and output components (e.g., video cameras and microphones) and broadcasting client 342 software for the spectating system 300 via which respective players/broadcasters may generate live A/V streams of their online game play and commentary for broadcasting to spectators via the game spectating system 300. The broadcasters may also receive spectator feedback (e.g., audio and/or textual commentary or chat) from the spectating system 300, for example via the broadcasting client 342 software. Each spectator device 360 may include, but is not limited to, input and output components and spectating client 362 software via which respective spectators may interact with the spectating system 300 to select, receive, and view live or recorded broadcasts 312, and via which the spectators may provide spectator feedback (e.g. audio or textual commentary) to broadcasters.

In some embodiments, a game spectating environment may include a highlight component, module, or service 306. In some embodiments, highlight service 306 may include one or more computing devices, for example one or more server devices, that implement highlight processing components or modules and one or more APIs to the highlight service 306 functionality provided by the highlight processing modules. Highlight service 306 may also include other devices including but not limited to storage devices that may store highlights and highlight reels, and that may also be used to store other data and information used by the highlight service 306 such as highlight information including but not limited to spectator highlight preferences. In some embodiments, as shown in FIG. 3, highlight service 306 may instead be implemented as a component, module, or subsystem of spectating system 300. While FIG. 3 shows highlight service 306 as a component of a spectating system, 300, in some embodiments highlight service 306 may be implemented as a separate service or system from spectating system 300, for example as a network-based service that is accessible by one or more entities including but not limited to spectating system 300. FIGS. 4A through 4F and FIG. 5 illustrate components and operations of an example highlight service 306 in more detail, according to some embodiments.

In some embodiments, highlight service 306 functionality may be implemented in part on other devices in the spectating environment. For example, in some embodiments, analysis modules may be installed on at least some broadcaster 340 and/or spectator devices 360. The analysis modules may locally perform audio, text, speech, or other analysis for participants (player/broadcasters or spectators) associated with the devices, and may stream or upload the participant analysis information to the spectating system 300 and/or highlight service 306 for use in identifying events including but not limited to highlights in respective broadcasts 312.

In some embodiments, a spectating system 300 may support broadcasts of live and/or recorded digital media content via broadcaster devices 340 from sources other than game systems 320. For example, in some embodiments, the spectating system 300 may support broadcasts of live streams from sports games, competitions, concerts, and other events including but not limited to live streams from electronic spectator sports (eSports) competitions.

Figure 9:
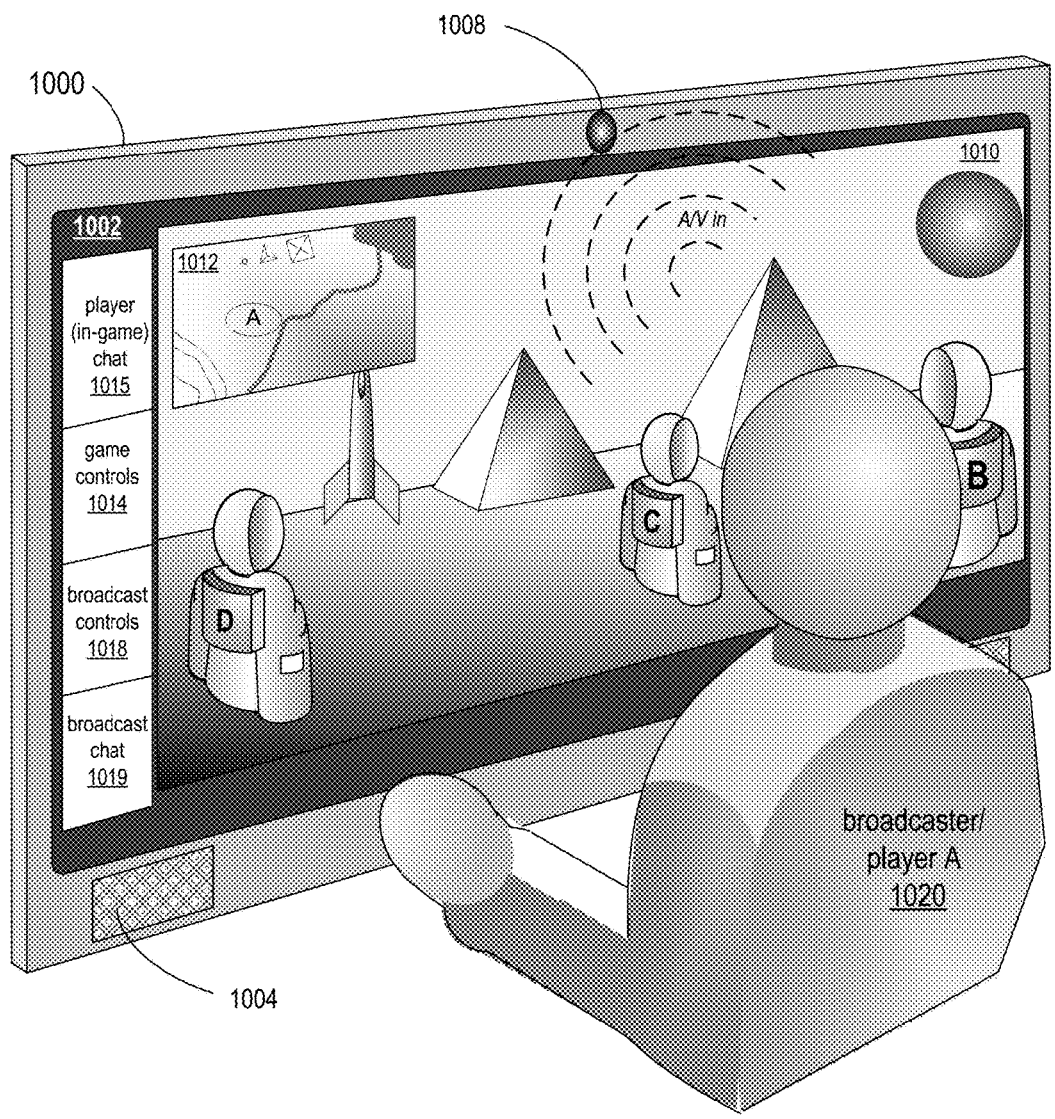
FIG. 9 provides a non-limiting example of a broadcaster user interface for a game spectating system, according to some embodiments.

The following is a broad description of an example method for streaming live broadcasts in a game spectating system, and is not intended to be limiting. Typically, a game system 320 may include a game engine 322 that renders a 2D or 3D representation of a game universe based on the current state of the universe, generates video and sound, and sends or streams the video and sound (A/V) output to broadcaster devices 340 via game UI/API 324 for processing and/or display by game clients 344. On a broadcaster device 340, the player/broadcaster interacts with the game system 320 and participates in the game executing on the game system 320 using game client 344, and uses broadcasting client 342 software and A/V components of the device 340 to construct a live stream of the broadcaster's game play for broadcast. The live stream may include the game A/V received from the game system 320, and may also include video and audio input of the player captured by A/V components (e.g., a video camera and microphone) of the device 340 either as a separate stream or embedded in the game A/V stream. The player/broadcaster may also use broadcasting client 342 to provide text input for a broadcast, for example text input to a broadcast chat window. In some embodiments, broadcasters may tag or mark interesting or notable events as highlights in broadcasts 312A via broadcasting client 342 interface. FIG. 9 provides a non-limiting example of a broadcaster user interface for a game spectating system, according to some embodiments.

The live streams of the broadcasts 312A are sent from the broadcasting clients 342 to the spectating system 300 according to the broadcasting UI/API 303. Video input may be received by spectating system 300 in any of a variety of video formats. Audio input may, for example, be received by spectating system 300 as audio tracks in video input, as Voice over IP (VoIP), or according to other network formats or protocols that support digital audio transmission. On the spectating system 300, spectating service 302 processes the live streams of the broadcasts 312A for rebroadcast 312B to spectator devices 360. In some embodiments, at least some of the broadcasts 312 may be recorded and stored for playback. In some embodiments, at least some of the broadcasts 312C may be provided to the highlight service 306 for processing.

On a spectator device 360, a spectator may select a particular broadcast 312B or channel for viewing via a broadcast interface 364 provided by the spectating client 362. The spectating service 302 may then stream the live broadcast 312B to the spectating client 362 on the respective spectator device 340 via spectating UI/API 304 for display on the broadcast interface 364. The spectator may use spectating client 362 software and A/V components of the device 360 (e.g., a microphone) to provide audio input (e.g., vocal commentary, cheers, crowd noise, or vocal chat) regarding the current broadcast 312B being viewed. The spectator may also use spectating client 362 to provide text input, for example text input to a broadcast chat window. In some embodiments, spectators may tag or mark interesting or notable events as highlights in broadcasts 312B via broadcast interface 364. FIGS. 7 and 10 provide non-limiting examples of spectating user interfaces that may be used to select and view broadcasts in a game spectating environment, according to some embodiments.

The highlight service 306 may obtain highlight data indicating interesting and/or notable events ("highlights") in broadcasts 312C and/or in games executing on the game systems 320. The highlight data may be processed by the highlight service 306 to determine highlights 358 from the broadcasts 312C. Highlight service 306 may obtain the highlight data from one or more sources. The following provides several non-limiting examples of methods for obtaining and processing highlight data by a highlight service 306 to determine highlights 358 from broadcasts 312C. Note that these examples of highlight data and of methods for obtaining and processing the highlight data are not intended to be limiting, and may be used alone or in combination.

In some embodiments, the highlight data may include game highlight events 334 received from the game systems 320. The game highlight events 334 for a given game system 320 may indicate game-specific, in-game highlights as defined by the respective game system 320 and detected by a game highlight detection 326 component of the game system 320. In some embodiments, the game highlight events 334 may be received according to a game highlight API 307 to the highlight service 306. While FIG. 3 shows the game highlight events 334 being received directly by the highlight service 306 from game highlight detection 326 components on the game systems 320, in some embodiments at least some of the game highlight events 334 may be included as metadata in game A/V 330 sent to the game clients 344, and thus may be included in the broadcast 312 streams sent from the broadcaster devices 340 to the spectating service 302; the spectating service 302 may then provide the game highlight events 334 to the highlight service 306. FIGS. 4A and 4B illustrate receiving and processing game highlight events 124 to determine highlights in broadcasts, according to at least some embodiments.

In some embodiments, the highlight data may instead or in addition include highlight tags 316 indicating spectators' and/or broadcasters' inputs to the spectating service 302 marking or tagging interesting or notable events (highlights) in broadcasts 312. In some embodiments, spectating service 302 may communicate with the highlight service 306 to provide the participants' highlight tags 316 that mark or otherwise indicate interesting or notable events (highlights) in broadcasts 312. FIGS. 4A and 4C illustrate receiving and processing participants' highlight tagging inputs to a spectating system 100 to determine highlights in broadcasts, according to at least some embodiments.

In some embodiments, the highlight data may instead or in addition include participant (broadcaster and/or spectator) interactions 314 with the spectating system 302. Participant interactions 314 may include broadcaster input and interactions 310 such as broadcaster commentary, in-game voice or text chat, and broadcast text chat, and spectator input and interactions 354 such as spectator vocal comments, crowd noise, and broadcast text chat. In some embodiments, spectating service 302 may receive broadcasters' input and interactions 310 from broadcaster devices 340, and may also receive spectators' input and interactions 354 from spectator devices 360. In some embodiments, spectating service 302 may receive the input and interactions via UI/APIs 303 and 304, respectively. In some embodiments, spectating service 302 may receive at least some of the input and interactions 310 from broadcasting clients 342 as part of the broadcast 312A streams. In some embodiments, spectating service 302 may communicate with the highlight service 306 to provide participant interactions 314 (e.g., spectator and/or player video, audio, text, and other input and interactions) to the highlight service 306. FIGS. 4A and 4D illustrate receiving and processing participant interactions with a spectating system 100 to determine highlights in broadcasts, according to at least some embodiments.

The highlight service 306 may use the highlight data to determine highlights 358 from respective broadcasts 312C. In some embodiments, the highlight service 306 determines highlight segments from the broadcasts 312C according to respective highlight data. Each highlight segment includes an interesting or notable event (a "highlight") from the respective game and/or broadcast 312C as determined according to highlight data for the game and/or broadcast 312C. In some embodiments, the highlight service 306 may determine sets or "reels" of highlights from the highlight segments according to one or more highlight selection criteria such as game genres, game titles, player/broadcasters, time periods, and so on. In some embodiments, sets of highlights tailored to particular spectators may be determined according to the spectators' specified or otherwise determined preferences. FIG. 5 illustrates a highlight presentation component for a highlight service, according to at least some embodiments. The highlight service 306 may provide access to the highlights 358 via a spectator highlight UI/API 308 that presents a highlight interface 366 to the spectators on respective spectator devices 360. The spectators may then selectively view specific highlights 358 via input 356 to the highlight UI/API 308. In some embodiments, particular sets or "reels" of highlights 358 (e.g., highlights 358 from particular genres, games, broadcasters, players, etc.) may be provided to particular spectators via the highlight UI/API 308 and highlight interface 366 based on the spectators' specified or otherwise determined highlight viewing preferences. FIGS. 7, 8, and 10 provide non-limiting examples of spectator highlight UIs that may be used in spectating systems 300, according to some embodiments.

FIG. 4A illustrates components and operations of a highlight service in a spectating system, according to at least some embodiments. In some embodiments, a highlight service 406 may include one or more computing devices, for example one or more server devices, that implement one or more components or modules of the highlight service 406 and that provide one or more APIs to the highlight service 406 functionality provided by the highlight service 406. Highlight service 406 may also include or access other devices including but not limited to storage devices or systems (shown as store 479) for storing highlights and highlight reels 486, and that may also be used to store other data and information used by the highlight service 406 such as highlight information 484 including but not limited to spectator highlight preferences, various interaction analysis data 482 used in analyzing broadcasts and participant interactions to detect and extract highlights, and highlight analysis data such as highlight attributes and event statistics that may be used to auto-generate highlights from input videos 418 and/or game metadata 419. In some embodiments, highlight service 406 may be implemented as a network-based service that is accessible by one or more entities including but not limited to a spectating system as illustrated in FIGS. 1 through 3. In some embodiments, highlight service 406 may instead be implemented as a component, module, or subsystem of a spectating system as illustrated in FIGS. 1 through 3.

In some embodiments, the highlight service 406 may include, but is not limited to, a highlight generation 470 component that determines highlights from broadcasts 412, and a highlight presentation 480 component that may create highlight reels from the determined highlights and present the highlight reels as highlights 458 to spectators at least in part according to spectator highlight input 456. A highlight reel may include two or more highlight segments selected from one or more broadcasts. In some embodiments, highlight reels may be streamed to spectator devices via spectator highlight UI/API 408 in a continuous loop. Highlight reels may be presented to the spectators via highlight interfaces on respective spectator devices for selection and viewing. FIGS. 7, 8, and 10 provide non-limiting examples of highlight interfaces that may be used in embodiments.

In some embodiments, highlight generation 470 component may include a game highlight event processing 472 module that processes game highlight events 434 to determine game-specified highlights from broadcasts 412, a participant highlight tag processing 474 component that processes highlight tags 416 to determine participant-specified highlights from broadcasts 412, and a participant interaction processing 476 component that processes participant interactions 414 to determine highlights from broadcasts 412 based on participants' inputs and interactions (audio, video, text, speech, etc.) during the broadcasts 412. In some embodiments, highlight generation 470 component may include one or more auto-generation analysis modules 478 that may process input videos 418 and/or game metadata 419 using one or more techniques to discover highlights in the videos. Auto-generation analysis modules 478 may, for example, include a machine learning analysis module or service that analyzes video content to determine highlights, and/or a statistically improbable analysis module or service that analyzes input game data to determine highlights.

In some embodiments, in addition to determining highlights that show interesting or notable events from broadcasts 412, highlight generation 470 component may process inputs to generate information that anticipates or predicts potential upcoming highlight events in game sessions or broadcasts. For example, in a sports game, audio, textual, or other input may be analyzed to generate predictions of upcoming big plays, or in a MOBA or MMOG audio, textual, or other input may be analyzed to generate predictions of upcoming fights or battles. This information predicting highlight events in broadcasts may be presented to the spectators so that the spectators can view the predicted highlight events in real-time, if desired.

In some embodiments, the highlight generation 470 component of the highlight service 406, or alternatively one or more of the modules in highlight generation 470 service, may include a highlight window determination component or module that may determine temporal windows (e.g. start and end points) for highlight events detected by the module(s) in highlight generation 470 component to generate highlight segments for output to highlight presentation 480. The windows provide context for detected highlight events, for example the beginning and end of outstanding plays. In some embodiments, data input to the highlight generation 470 component may include information that may be used to dynamically identify the beginning and/or end of highlight windows around detected highlight events. Instead or in addition, highlight window lengths around detected highlight events may be set by input window parameters to or settings for the highlight generation 470 component. In some embodiments, the input parameters may include viewer preferences. For example, one viewer may prefer to see more context around highlights than another viewer.

In some embodiments, the highlight service 406 may include or provide a game highlight API 407 via which game systems or other entities may provide game highlight events 434 to the highlight service 406. The game highlight events 434 may indicate game-specific highlights as defined and detected by respective game systems.

In some embodiments, the highlight service 406 may include or provide a spectator highlight UI/API 408 that presents a highlight interface to spectators via spectator clients on respective spectator devices. The spectators may interact with the highlight service 406 via inputs 456 to the spectator highlight UI/API 408, for example to select and view specific highlights 458, to define or modify filters for highlights 458, to set up or modify spectator highlight viewing preferences, and so on. In some embodiments, particular sets or "reels" of highlights 458 (e.g., highlights from particular genres, games, broadcasters, players, etc.) may be provided to particular spectators via the highlight UI/API 408 based on the spectators' specified or otherwise determined highlight viewing settings and preferences.

FIGS. 4B through 4F and FIG. 5 further illustrate components, modules, and operations of an example highlight service 406 as shown in FIG. 4A.

FIG. 4B illustrates game highlight event processing to determine highlights in a game spectating system, according to at least some embodiments. In some embodiments, highlight data that may be received and processed by a highlight service 406 to determine highlights 458 from broadcasts 412 may include game highlight events 434 generated by game systems 420. The game highlight events 434 for a given game system 420 may indicate game-specific, in-game highlights as defined and detected by the respective game system 420. In some embodiments, a highlight service 406 may include a game highlight event processing 472 module that processes game highlight events 434 to determine game-specified highlights 458A from broadcasts 412.

In some embodiments, the highlight service 406 may include or provide a game highlight API 407 via which game systems 420 can provide game highlight events 434 to the highlight service 406 in a common format. Each game highlight event 434 may indicate a game-defined interesting or notable event (highlight) in game play on a respective game system 420. FIG. 4B illustrates a non-limiting example format for game highlight events 434, according to some embodiments. In this example, each game highlight event 434 may be a record that may include one or more of, but is not limited to:

- A timestamp (date/time) that indicates "real world time" for the game highlight event.
- A game ID that may be used to identify the game system 420 that generated the event 434.
- A game session ID that may be used to identify a particular game session executed by the game system 420.
- A game session timestamp (date/time) that indicates time within the game universe/on the game session timeline ("game time") for the game highlight event.
- An event type for the game highlight event. An event type may be common across all game systems 420 or across some game systems 420 (e.g., all games within a genre), or may be specific to/defined by a particular game system 420.
- A duration for the event. The duration may be indicated in real time, in game time, or in both.
- A location within the game universe or game world for the event.
- Other event information. For example, information identifying players or teams of players that are involved in the event, broadcasters that are involved in the event, a summary description of the event, a rating for the event (e.g., event significance on a scale from 1 to 10), or in general any information that may be relevant to an in-game event.

The game highlight event processing 472 module may receive and process the game highlight events 434 to determine game-specified highlights 458A from broadcasts 412. In some embodiments, the game highlight event processing 472 module may map at least some of the game highlight events 434 to particular broadcasts 412. In some embodiments, for example, each broadcast 412 may include metadata indicating a particular game system 420, game session, and broadcaster/player for the broadcast 412, and the game highlight event processing 472 module may map at least some of the game highlight events 434 to particular broadcasts 412 according to the game ID, game session ID, and other event information fields of the game highlight event 434 records. Once a game highlight event 434 is mapped to a broadcast 412, the timestamp/duration information within the event 434 record may be used to identify and extract a highlight segment from the broadcast 412 as a game-specified highlight 458A. The game-specified highlight 458A may be tagged with metadata describing the highlight event, for example with at least some of the data from the respective game highlight event 434 record.

In some embodiments, in addition to indicating highlights in games, game highlight events 434 may be provided that anticipate or predict potential upcoming events in online game sessions. For example, in a sports game, a game highlight event 434 may be provided prior to an important offensive play, or in a MOBA or MMOG a game highlight event 434 may be provided that indicates an upcoming fight or battle. This information predicting highlight events in games may be presented to the spectators so that the spectators can view broadcasts of the predicted highlight events in real-time, if desired.

FIG. 4C illustrates participant highlight tag processing to determine highlights in a game spectating system, according to at least some embodiments. In some embodiments, highlight data that may be received and processed by a highlight service 406 to determine highlights 458 from broadcasts 412 may include highlight tags 416 generated by broadcasters and/or spectators via respective spectating system clients on their respective devices 440 and 460. The highlight tags 416 for a given broadcast 412 may indicate interesting or notable events in the broadcast 412 according to the broadcaster and/or spectators of the broadcast 412. In some embodiments, a highlight service 406 may include a participant highlight tag processing 474 module that processes highlight tags 416 to determine participant-specified highlights 458B from broadcasts 412.

In some embodiments, the highlight service 406 may include or provide UI/APIs 403 and 404 via which broadcasters and/or spectators can provide highlight tags 416 to the highlight service 406 in a common format. Each highlight tag 416 may indicate a participant-defined interesting or notable event (highlight) in a respective broadcast 412. FIG. 4C illustrates a non-limiting example format for highlight tags 416, according to some embodiments. In this example, each highlight tag 416 may be a record that may include one or more of, but is not limited to:

- A timestamp (date/time) for the highlight tag.
- A broadcast ID that may be used to identify the broadcast 412 for which this tag 416 event was generated.
- A participant ID that may be used to identify a particular broadcaster and/or spectator that generated this tag 416 event.
- An event type for the tag 416. As an example, in some embodiments tag event types may include "start" tags and "stop" tags that indicate the start of an interesting or notable event and the end of the respective event; thus, two tags (a start and stop tag) would define an event in the respective broadcast 412 as indicated by the respective participant.

In some embodiments, event tags 416 may include other information about a participant-specified event. For example, in some embodiments, event tags 416 may indicate a duration for the respective event. In some embodiments, event tags 416 may indicate a location within the game universe or game world for the event. In some embodiments, event tags 416 may include one or more of information identifying players or teams of players that are involved in the event, information identifying broadcasters that are involved in the event, a summary description of the event, or a rating for the event (e.g., event significance on a scale from 1 to 10).

In some embodiments, spectators and/or broadcasters may vote on events in broadcast 412 streams or game sessions via respective spectating system clients to determine if the event is to be a highlight 458B. For example, spectators and/or broadcasters may be prompted to respond with an up or down vote for event(s) in broadcast 412 streams or game sessions, and the event tags 416 may include voting information (e.g. up/down vote information) for the events in broadcast 412 streams or game sessions.

The participant highlight tag processing 474 module may receive and process the highlight tags 416 to determine participant-specified highlights 458B from broadcasts 412. In some embodiments, the participant highlight tag processing 474 module may map at least some of the highlight tags 416 to particular broadcasts 412 according to the broadcast ID. Once the highlight tags 416 are mapped to broadcasts 412, the highlight tags 416 may be used to identify and extract highlight segments from the broadcasts 412 as participant-specified highlights 458B. The participant-specified highlights 458B may be tagged with metadata describing the respective highlight events.

In some embodiments, to identify and extract highlights 458B in a broadcast 412 from the highlight tags 416 for the broadcast 412, the participant highlight tag processing 474 module may analyze the highlight tags 416 according to information in the tags 416 to determine how many and/or which participants tagged a given event in a broadcast 412 or game session as a highlight event. For example, in some embodiments, the participant highlight tag processing 474 module may determine that a tagged event is to be extracted as a highlights 458B if at least a threshold number or percentage of spectators tagged the event as and/or voted for the event as a highlight. As another example, a broadcaster's tag 416 may automatically make a respective event a highlight 458B, or alternatively a broadcaster's tagged event may be put up for vote by the spectators to determine if the event is to be considered a highlight 458B. In some embodiments, participant's opinions on events as expressed through the tags 416 may be weighted; for example, a given spectator may be a highly-rated spectator or designated commentator, and the spectator's tags 416 may automatically make a respective event a highlight 458B, or the spectator's tags 416 may be given more weight than those of other spectators when tagging or voting on events as potential highlights 458B.

In some embodiments, in addition to indicating highlights in broadcasts, highlight tags 416 may be provided that anticipate or predict potential upcoming events in broadcasts. For example, in a sports game, spectators and/or broadcasters may generate highlight tags 416 in anticipation of an important offensive play, or in a MOBA or MMOG a game highlight tags 416 may be generated that indicate a potential upcoming fight or battle. This information predicting highlight events in broadcasts may be presented to the spectators so that the spectators can view broadcasts of the predicted highlight events in real-time, if desired.

FIG. 4D illustrates participant interaction processing to determine highlights in a game spectating system, according to at least some embodiments. In some embodiments, the highlight data that may be received and processed by a highlight service 406 to determine highlights 458 from broadcasts 412 may include participant (broadcaster and/or spectator) audio and/or textual input and interactions with the spectating system 400 (e.g., broadcaster commentary, in-game voice or text chat, broadcast text chat, spectator vocal comments, crowd noise, etc.). In some embodiments, the highlight data may instead or in addition include video of participants (broadcasters and/or spectators) during broadcasts 412. In some embodiments, a highlight service 406 may include a participant interaction processing 476 component that processes participant interactions 414 to determine highlights from broadcasts 412 based on participants' various inputs and interactions (e.g., audio, video, text, speech, etc.) during the broadcasts 412.

In some embodiments, participant interaction processing 476 component may include or have access to one or more analysis modules 492 that analyze and process participants' various inputs and interactions (e.g., audio, video, text, speech, etc.) to detect events 494 in broadcasts 412 based on the inputs and interactions related to the broadcasts 412. In some embodiments, analysis modules 492 may include, but are not limited to, a video analysis 492A module, an audio analysis 492B module, a text analysis 492C module, and a content analysis 492D module.

In at least some embodiments, generally, an analysis module 492 may perform analysis on its input signal(s) and/or other input data to determine one or more metrics from the inputs, and then may match the determined metrics to known patterns. The patterns may then be mapped to particular types of events that may be output as detected events 494. In some embodiments, in addition to detecting events 494 that indicate highlights of interesting or notable events from broadcasts 412, an analysis module 492 may detect events 494 that anticipate or predict potential upcoming events in game sessions or broadcasts. For example, in a sports game, events 494 may be detected that anticipate upcoming big plays, or in a MOBA or MMOG events 494 may be detected that anticipate upcoming fights or battles.

In some embodiments, participant interaction processing 476 component may also include or have access to one or more sources of interaction analysis data 499 that may be used in analyzing the participants' interactions to detect events 494. The interaction analysis data 499 may include data that is specific to games and game systems (e.g., mappings of particular audio, text, and/or speech to specific events in games), and may also include data that is specific to particular participants or groups of participants (e.g., audio or speech patterns, facial metrics, etc.).

In some embodiments, participant interaction processing 476 component may also include a detected event processing 496 module that processes the events 494 detected by the analysis modules 492 to determine and extract highlights 458C from the broadcasts 412. In some embodiments, the analysis modules 492 may provide detected events 494 to the detected event processing 496 module in a common format, for example according to an API for the module 496. The detected events 494 may indicate potentially interesting or notable events in the broadcasts 412 as determined from analysis of the participants' various interactions 414. FIG. 4D illustrates a non-limiting example format for detected events 494, according to some embodiments. In this example, each detected event 494 may be a record that may include one or more of, but is not limited to:

At least one timestamp (date/time) for the detected event 494. The timestamp(s) may include real-time timestamps and/or "game time" timestamps.

A broadcast ID that may be used to identify the broadcast 412 for which this event 494 was detected.

A participant ID that may be used to identify a particular broadcaster and/or spectator related to this detected event 494.

An event type for the detected event 494. An event type may an in-game event type; a game event may be common or generic across all game systems 420 or across some game systems 420 (e.g., all games within a genre), or may be specific to/defined by a particular game system 420.

In some embodiments, detected event 494 records may include other information about an event. For example, in some embodiments, detected event 494 records may indicate a duration for the respective event. In some embodiments, detected event 494 records may indicate a location within the game universe or game world for the event. In some embodiments, detected event 494 records may include one or more of information identifying players or teams of players that are involved in the event, information identifying broadcasters and/or spectators that are involved in the event, a summary description of the event, or a rating for the event (e.g., event significance on a scale from 1 to 10). In some embodiments, a detected event 494 record may include a confidence level for the event that may indicate how confident the respective analysis module 492 is that the analyzed input data correlates to the indicated event 494.

In some embodiments, participant interaction processing 476 component may include or have access to a video analysis 492A module. In some embodiments, participant interactions 414 may include video of participants (broadcasters and/or spectators) captured during a broadcast 412, for example by video cameras attached to or integrated with the participants' respective devices 440 or 460. The participant video may be analyzed, for example using facial recognition techniques and techniques that detect emotions via analysis of facial expressions, to determine metrics that may be used in identifying events in respective broadcasts 412. For example, a broadcaster's facial expressions may captured by a live video feed included in a broadcast 412, and the video may be analyzed to detect emotions of the broadcaster during game play. Various emotions such as surprise, fear, happiness, intense concentration, and so on may be detected that may be correlated to in-game events (victories, defeats, startling in-game events, etc.) or to broadcast events (e.g., the broadcaster spilled a drink on his keyboard, fell out of his chair, etc.). As another example, some embodiments may obtain images of participants' eyes (broadcasters, players, commentators and/or spectators) captured during game play or broadcast, for example images captured by cameras attached to or integrated with wearable computing devices such as smart glasses, goggles, optical head-mounted displays, virtual reality (VR) headsets, and the like. The images may be analyzed, for example using techniques that detect emotions or other states via tracking and analysis of eye movements, blinking, dilation, and so on. The analysis may be used alone or in combination with analysis of other inputs such as audio inputs to determine states of participants that may be used in detecting highlights in broadcasts or games as described herein.

In some embodiments, participant interaction processing 476 component may include or have access to an audio analysis 492B module. Online games and game spectating systems may support audio input/output and communications for game players and for game spectators. For example, a player in an online game may communicate game play commands, suggestions, comments, strategy, chat, or other information to other players on their team within the game via audio input to a respective computing device. As another example, a broadcaster may provide vocal commentary to spectators via an audio channel of a game spectating system. As another example, spectators in a game spectating system may provide cheers, comment, chat, or other audio input for broadcasts via audio input channels to the game spectating system. Aggregated participants' (player and/or spectator) audio signals may be used to provide background chatter or "crowd noise" for an online game or broadcast. The participants' audio input signals may be captured by audiovisual (A/V) input components on the participants' respective client devices, digitized, and transmitted over a network to the online game or spectating system. At the online game or spectating system, the participants' audio signals may be aggregated, processed, and transmitted to the players' and/or spectators' respective devices for output as game or broadcast audio.

Audio analysis 492B module may process and analyze the various audio inputs from players, broadcasters, and/or spectators to detect events 494. In some embodiments, the audio analysis 492B module may perform signal analysis, for example time- and frequency-domain analysis, on the audio signals to determine one or more audio signal metrics from the audio signals. The metrics may, for example, include one or more of amplitude, pitch, duration, and frequency metrics, and in general any relevant metric that can be extracted from an audio or voice signal. The audio signal metrics may be analyzed, for example by comparing the metrics to known or learned audio patterns for individual participants or groups of participants, to determine information about the participants and/or the game session.

In some embodiments, the audio signals may be individually analyzed to determine metrics for each audio input, and the metrics may then be normalized, aggregated, and analyzed to determine information about groups of participants (players and/or spectators). In some embodiments, instead of or in addition to separately analyzing the audio signals and then aggregating the metrics for further analysis, the audio signals may be aggregated or combined and analyzed collectively to generate metrics for and information about groups of participants.

In some embodiments, metadata obtained for or with the audio input signals may be used when analyzing the audio input signals to determine information about the spectators and/or players. For example, the metadata may indicate affiliations or team preferences for spectators of a sports game based on the spectators' profile information. The spectator audio signals for a game may be segmented into two or more groups according to the metadata, for example into groups of fans of two opposing teams in a sports game such as football according to the spectators' indicated team affiliations, and analyzed separately according to the groups to determine group-specific information about the current game session or broadcast. For example, the group-specific information may indicate which group of spectators are currently cheering or booing, which group is the loudest and/or quietest, and so on. In some embodiments, player/broadcaster audio signals may also be segmented into groups (e.g., opposing teams) according to player profile information for player group analysis.

In some embodiments, the determined information may, for example, indicate an emotional state or states (e.g., excitement, stress, fear, shock, surprise, amusement, etc.) of individual participants (players and/or spectators) based on the analysis of the individual participants' vocalizations or other sounds in the respective audio signals. In some embodiments, the determined information may instead or also indicate a state or states for a group or crowd (e.g., excitement, stress, approval, disapproval, etc.) based on an analysis of the combined audio signal metrics for two or more participants (players and/or spectators). In some embodiments, the information may also indicate a level for a determined state, for example an indication of how excited a crowd of spectators appears to be based on an analysis of aggregated spectator audio input.

In some embodiments, the information determined from the analysis of the participant audio input may be used to detect particular events 494 in an online game session or broadcast. For example, in some embodiments, at least some of the audio patterns to which the audio signal metrics are matched may be mapped to particular types of events in a respective online game. For example, in a sports game, particular crowd (spectator) and/or player audio patterns may be mapped to big plays, such as scoring plays or great defensive plays. In some embodiments, the information may anticipate or predict a potential upcoming event in an online game session or broadcast. For example, in a sports game, particular crowd (spectator) and/or player audio patterns may be mapped to what typically happens prior to a particular big event, such as crowd silence or chanting before an important offensive play in a football game, or very low crowd noise before a big defensive play in a football game. In some embodiments, the information may also indicate locations and times within the game universe for particular events to which the analyzed audio signals are mapped. For example, analysis of aggregated spectator or player audio signals and correlated metadata may indicate a particular location or area in the online game universe, and a particular time within the game timeline.

In some embodiments, audio analysis 492B module may identify and extract words, phrases, or other content from the input audio associated with a broadcast 412. In some embodiments, audio analysis 492B module may analyze the content to detect events 494. For example, the audio analysis 492B module may try to match keywords or phrases that it identifies in the audio stream(s) of a broadcast 412 to keywords or phrases associated with events in game play in general, to keywords or phrases associated with particular events in the genre or game that the broadcaster is participating in as a player, and/or to keywords or phrases associated with particular participants (e.g., broadcasters). In some embodiments, audio analysis 492B module may provide the extracted content to another analysis module 492, for example a content analysis 492D module, which performs analysis of the extracted content to detect events 494 for the broadcast 412.

In some embodiments, participant interaction processing 476 component may include or have access to a text analysis 492C module. Instead of or in addition to audio input, online games and game spectating systems may support text input/output and communications for game players and for game spectators. For example, players in online games may communicate game play commands, suggestions, comments, strategy, or other information to other players on their team within the game via text input to an in-game chat window. As another example, broadcasters and spectators may participate in chat windows associated with particular broadcasts in a game spectating system. In some embodiments, text analysis 492C module may parse the text from one or more sources in a broadcast 412 (e.g., an in-game chat window and a broadcast chat window) to identify and extract words, phrases, or other content from the input text. In some embodiments, text analysis 492C module may analyze the extracted text content to detect events 494. For example, the text analysis 492C module may try to match keywords or phrases that it identifies from the content of chat windows associated with a broadcast 412 to keywords or phrases associated with events in game play in general, to keywords or phrases associated with particular events in the genre or game that the broadcaster is participating in as a player, and/or to keywords or phrases associated with particular participants (e.g., broadcasters). In some embodiments, text analysis 492C module may provide the extracted content to another analysis module 492, for example a content analysis 492D module, which performs analysis of the extracted content to detect events 494.

In some embodiments, participant interaction processing 476 component may include or have access to a content analysis 492D module. Content analysis module 492D may receive content (e.g., words and/or phrases) extracted from audio/voice and/or text chat inputs to the broadcasts 412, and may analyze the received content to detect events 494. For example, the content analysis 492D module may try to match keywords or phrases from the extracted content to keywords or phrases associated with events in game play in general, to keywords or phrases associated with particular events in the genre or game that the broadcaster is participating in as a player, and/or to keywords or phrases associated with particular participants (e.g., broadcasters). In some embodiments, content analysis 492D module may access one or more interaction analysis data 499 sources to search data sets of keywords or phrases associated with particular genres, games, broadcasters, and so on; the data sets may map the keys to particular events or types of events of interest that may be considered as broadcast highlights.

Figure 4E:
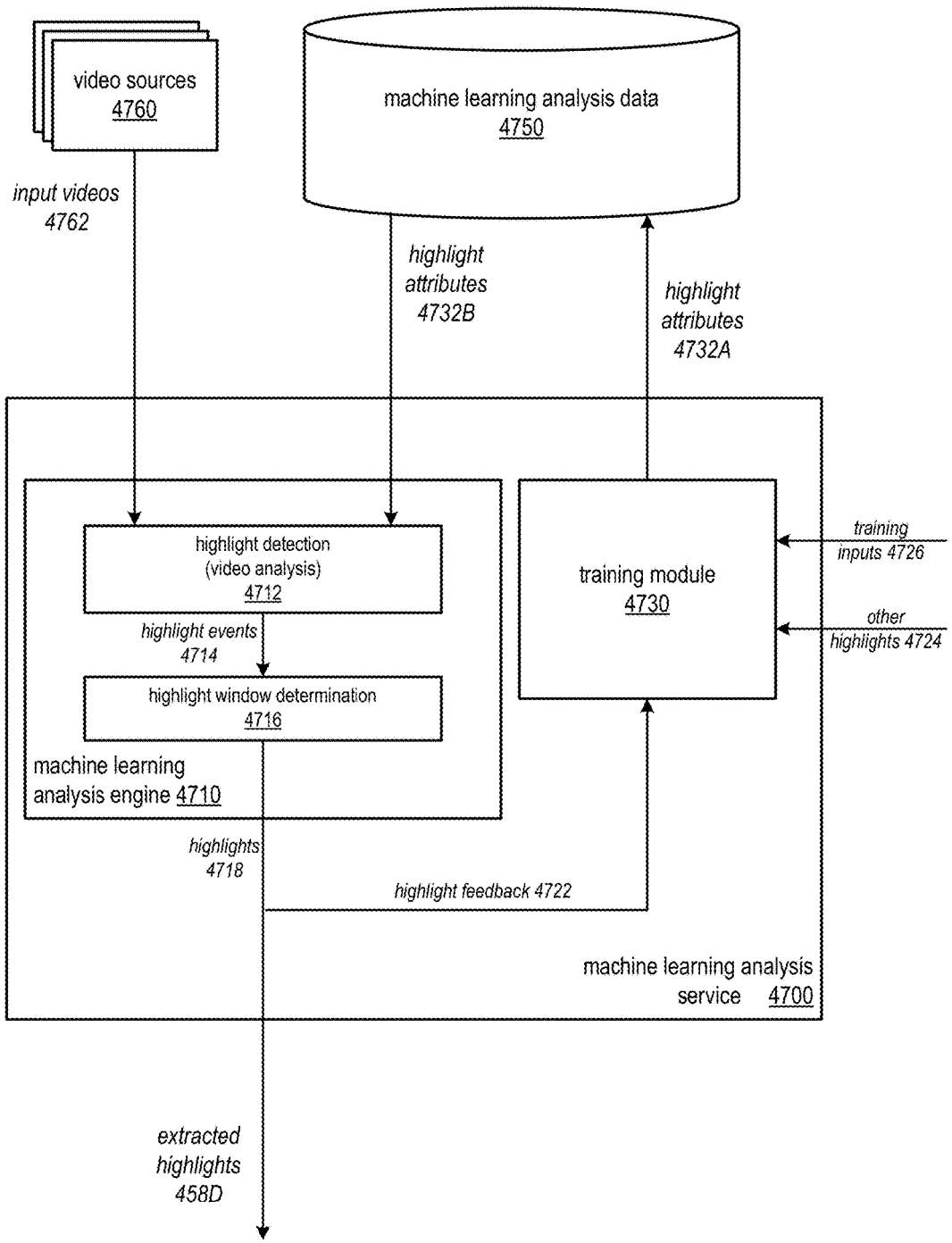
FIG. 4E illustrates machine learning analysis of video content to determine highlights in a game spectating system, according to at least some embodiments.

FIG. 4E illustrates machine learning analysis of video content to determine highlights in a game spectating system, according to at least some embodiments. A machine learning analysis engine 4710 of a machine learning analysis service 4700 may perform video analysis 4712 on input videos 4762 using a corpus of training data 4750 to determine highlight events 4714 in and extract highlights 4718 from the videos 4762 by matching attributes 4732 extracted from known or previously identified highlights 4722 and/or 4724 to attributes extracted from the videos 4762. Machine learning analysis data 4750 may be trained on and store highlight attributes 4732 that are generic across multiple games and/or game genres, and/or highlight attributes that are specific to particular highlight events in particular games or game genres.

In some embodiments, the machine learning analysis engine 4710 may include a highlight window determination 4716 module that may determine windows (e.g. start and end points) for highlight events 4714 to generate highlights 4718 for output as extracted highlights 458D. The windows provide context for detected highlight events 4714, for example the beginning and end of outstanding plays. The highlight attributes 4732 may include one or more attributes that may be used to dynamically identify the beginning and/or end of highlight windows around detected highlight events 4714. Instead or in addition, highlight window sizes around detected highlight events 4714 may be set by input parameters to or settings for the engine 4710. In some embodiments, the input parameters may include viewer preferences. For example, one viewer may prefer to see more context around highlights than another viewer.

In some embodiments, at least some of the highlights 4718 may be provided as feedback 4722 to a training module 4730 to potentially be incorporated as highlight attributes 4732 data in a machine learning analysis data 4750 store. Machine learning analysis data 4750 may be trained on initial highlight data, and may store additional highlight attributes 4732 extracted by training module 4730 from input highlights 4724 (e.g., highlights determined by one or more of the other components of highlight generation 470 component as shown in FIG. 4A), and/or highlight attributes 4732 determined from highlight feedback 4722 from machine learning analysis engine 4710. Training inputs 4726 may include, but are not limited to, inputs from humans specifying, voting on, and/or ranking highlight segments being processed by training module 4730 for inclusion as additional highlight attributes 4732 in the machine learning analysis data 4750. Thus, machine learning analysis service 4700 may be tuned and may learn and incorporate improved highlight attributes to improve at identifying and classifying highlights based on video analysis of game video over time.

Figure 4F:
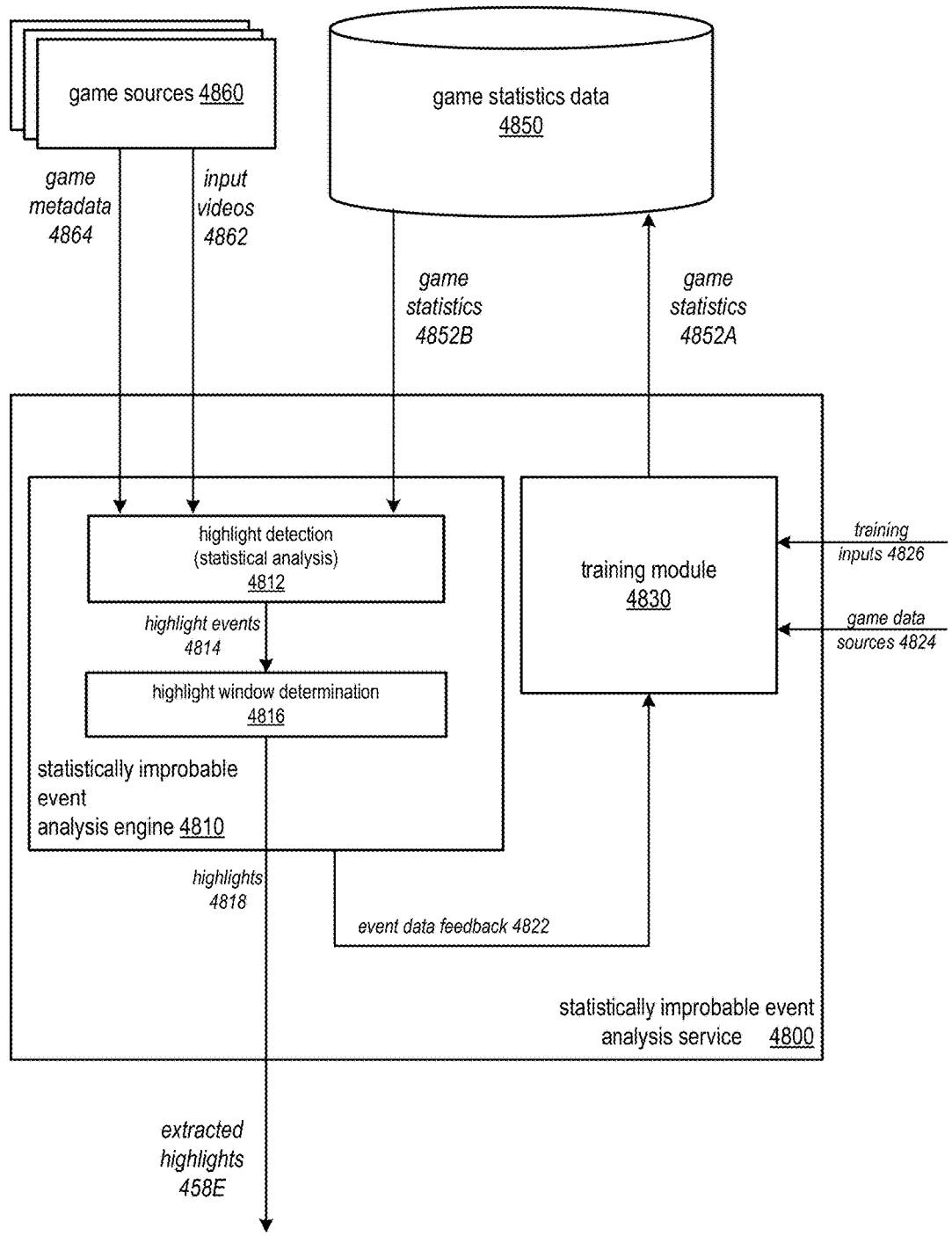
FIG. 4F illustrates statistically improbable analysis of game data to determine highlights in a game spectating system, according to at least some embodiments.

FIG. 4F illustrates statistically improbable analysis of game data to determine highlights in a game spectating system, according to at least some embodiments. A statistically improbable event analysis engine 4810 of a statistically improbable event analysis service 4800 may perform statistical analysis 4812 on input game metadata 4864 using game statistics 4852 from a corpus of game statistics data 4850 to determine highlight events 4814 in and extract highlights

4818 from videos 4862. The game metadata 4864 may include, but is not limited to, indications of game events, player performance metrics and statistics, and other game-related information as defined and detected by respective game systems, or as obtained from other sources, for games corresponding to input videos 4862. The game statistics data 4850 may, for example, include statistics 4852A determined by a training module 4830 from game data (e.g., event data, player performance metrics, etc.) for previously played games obtained from one or more sources 4824. For example, the statistical analysis 4812 may analyze the game metadata 4864 for a particular game using a corpus of game statistics 2852 data for multiple previously played sessions of the game to determine events in the new game that are statistically improbable based on the collected data from the previous games. Machine learning analysis data 4750 may be trained on and store game statistics 4852 that are generic across multiple games and/or game genres, and/or game statistics 4852 that are specific to particular games or game genres.

In some embodiments, the statistically improbable event analysis engine 4710 may include a highlight window determination 4716 module that may determine windows (e.g. start and end points) for highlight events 4814 to generate highlights 4818 for output as extracted highlights 458E. The windows provide context for detected highlight events 4814, for example the beginning and end of outstanding plays. In some embodiments, game metadata 4864 may include information that may be used to dynamically identify the beginning and/or end of highlight windows around detected highlight events 4814. Instead or in addition, highlight window sizes around detected highlight events 4814 may be set by input parameters to or settings for the engine 4810. In some embodiments, the input parameters may include viewer preferences. For example, one viewer may prefer to see more context around highlights than another viewer.

In some embodiments, at least some event data 4818 generated by the engine 4810 may be provided as feedback 4822 to a training module 4830 to be used in determining or refining game statistics 4852 for game statistics data 4750 store. Game statistics data 4850 may be trained on initial gam data, and may store additional game statistics 4852 extracted by training module 4830 from game data received from one or more sources 4824, and/or additional game statistics 4852 determined according to feedback 4822 from engine 4810. Training inputs 4826 may include, but are not limited to, inputs from humans specifying, voting on, and/or ranking highlight segments being processed by training module 4830 to determine or refine game statistics 4852. Thus, statistically improbable event analysis service 4800 may be tuned and may learn and incorporate improved game statistical data to improve at identifying and classifying highlights based on game statistics over time.

FIG. 5 illustrates a highlight presentation component for a highlight service, according to at least some embodiments. In some embodiments, a highlight service as illustrated in FIG. 4A may include a highlight presentation 580 component that may create highlight reels 510 from highlight segments 500 generated by a highlight generation 570 component, and present the highlight reels 510 to spectators via spectating clients 562. In some embodiments, a general highlight reel processing 582 module of the highlight presentation 580 component may create general highlight reels 510A (e.g., highlight reels for particular genres, games, broadcasters, players, etc.) from highlight segments that may be presented to spectators in general, and a targeted highlight reel processing 584 module may also create highlight reels 510B that are targeted at specific spectators or groups of spectators. Highlight reel 510 creation and presentation may be performed at least in part according to spectator highlight input 556 received from the spectating clients 562 via spectator highlight UI/API 508. Spectator preferences, viewing history, demographics, and other factors may also be leveraged in generating targeted highlight reels 510B. In some embodiments, particular ones of the general highlight reels 510A (e.g., highlight reels for particular genres, games, broadcasters, players, etc.) may be provided to particular spectators via the highlight UI/API 508 based on the spectators' specified or otherwise determined highlight viewing settings and preferences, viewing history, demographics, or other factors. In some embodiments, targeted highlight reels 510B may be generated for particular spectators based on the spectators' specified or otherwise determined highlight viewing settings and preferences, viewing history, demographics, or other factors.

In some embodiments, spectators may interact with the highlight service via inputs 556 to the spectator highlight UI/API 508, for example to select and view specific general highlight reels 510A, to define or modify filters for highlights 500 that may be used to generate targeted highlight reels 510B, to set up or modify spectator highlight viewing preferences that may be used to generate targeted highlight reels 510B, to select and view targeted highlight reels 510B, and so on.

In some embodiments, general highlight reel processing 582 module may select highlight segments 500 according to one or more highlight selection criteria 502 and compile the selected highlight segments 500 to form general highlight reels 510A. For example, module 582 may compile a highlight reel 510A that includes selected highlights from all broadcasts across all genres and games during a time period (e.g., a day). As another example, module 582 may compile a highlight reel 510A that includes selected highlights from all broadcasts within a genre (e.g., MOBA games, sports games, etc.) during a time period. As another example, module 582 may compile a highlight reel 510A that includes selected highlights from all broadcasts of a particular game title during a time period. As another example, module 582 may compile a highlight reel 510A that includes selected highlights from one or more broadcasters during a time period. The general highlight reels 510A may be stored 579 and/or streamed to one or more spectating clients 562 via spectator highlight UI/API 508 for display on a highlight interface 566. FIGS. 7, 8, and 10 provide non-limiting examples of highlight interfaces 566 that may be used in embodiments.

In some embodiments, targeted highlight reel processing 584 module may select highlight segments 500 according to spectator highlight input 556 and one or more highlight selection criteria 502 and compile the selected highlight segments 500 to form targeted highlight reels 510B. For example, module 584 may compile a highlight reel 510B that includes selected highlights from one or more spectator-specified genres within a spectator-specified time period. As another example, module 582 may compile a highlight reel 510A that includes selected highlights from two or more spectator-specified game titles during a spectator-specified time period. As another example, module 582 may compile a highlight reel 510A that includes selected highlights from one or more spectator-specified broadcasters during a time period. In some embodiments, targeted highlight reels 510B may be generated for particular spectators or groups of spectators based on other factors or information such as the spectators' preferences, viewing history, demographics, or other factors as indicated in spectator profiles maintained by the spectating system. The targeted highlight reels 510B may be stored 579 and/or streamed to one or more spectating clients 562 via spectator highlight UI/API 508 for display on a highlight interface 566. FIGS. 7, 8, and 10 provide non-limiting examples of highlight interfaces 566 that may be used in embodiments.

In some embodiments, the highlight presentation 580 component may allow spectators to specify particular types or genres of highlight segments 500 via inputs 556 to the spectator highlight UI/API 508. In some embodiments, the highlight presentation 580 component may allow a spectator to specify that they want to view highlight segments 500 similar to one or more highlight segments 500 that they have recently viewed. In some embodiments, one or more techniques may be used to dynamically identify similar highlight segments 500. For example, in some embodiments, highlight attributes 4732 as shown in FIG. 6E may be obtained or determined for the highlight segments 500, and the attributes 4732 may be used in identifying highlight segments 500 that are similar to a highlight segment 500 that a spectator has viewed or specified. Other metrics may be used in identifying similar highlight segments 500, including but not limited to highlight segment metrics determined from audio and/or text analysis of broadcast inputs as described herein.

In some embodiments, meta-analysis may be performed on the highlight information to determine metadata for highlight segments 500 across games or genres. As an example, analysis of highlight data for thousands or millions of games or game sessions may be used to determine game highlight statistics that can be used to detect games or sessions that appear to be particularly interesting, for example based on the number, density, type, quality, and/or ratings of highlight segments 500 detected in the games or sessions. The interesting games or sessions may then be highlighted for or presented to the spectators, for example via the spectator highlight UI/API 508.

Figure 6A:
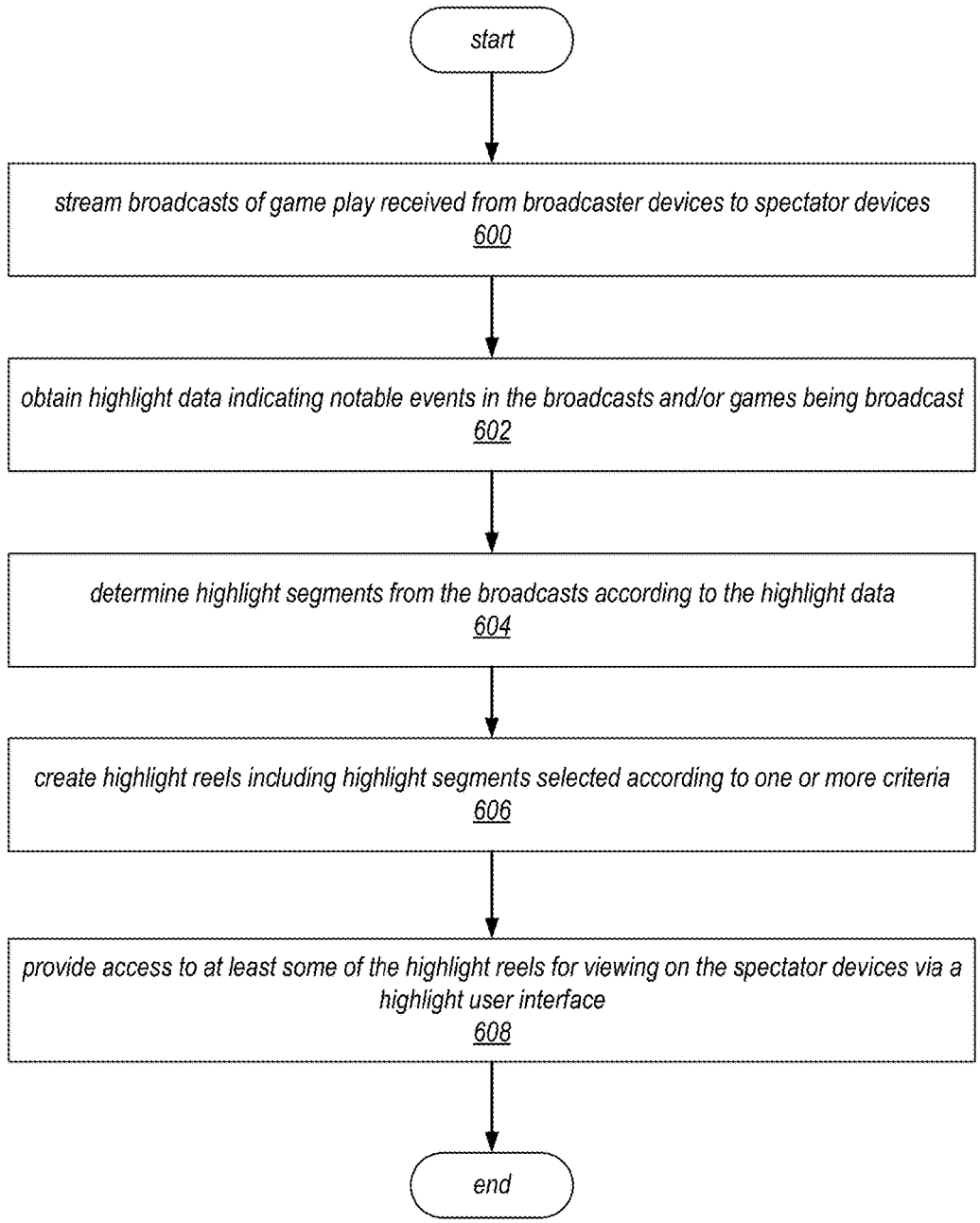
FIG. 6A is a more detailed flowchart of a method for determining and presenting highlights from broadcasts in a game spectating environment, according to at least some embodiments.

FIG. 6A is a more detailed flowchart of a method for determining and presenting highlights in a game spectating environment, according to at least some embodiments. As indicated at 600 of FIG. 6A, a spectating system may stream broadcasts of game play received from broadcaster devices to spectator devices. Each broadcast includes video showing game play of a respective broadcaster participating as a player in a game executing on a game system. As indicated at 602 of FIG. 6A, a highlight service may obtain highlight data indicating notable events in the broadcasts and/or games being broadcast. FIGS. 4A through 4F illustrate examples of highlight data and of methods for obtaining the highlight data in a highlight service. As indicated at 604 of FIG. 6A, the highlight service may determine highlight segments from the broadcasts according to the highlight data. FIGS. 4A through 4F illustrate example methods for determining highlight segments from broadcasts according to the various highlight data. As indicated at 606 of FIG. 6A, the highlight service may create highlight reels including highlight segments selected according to one or more criteria. FIG. 5 illustrates and example methods for generating highlight reels from determined highlight segments. As indicated at 608 of FIG. 6A, the highlight service may present and provide access to at least some of the highlight reels for viewing on spectator devices via a highlight user interface. FIGS. 5, 7, 8, and 10 provide non-limiting examples of methods for presenting highlights and highlight reels to spectators via highlight user interfaces.

Figure 6B:
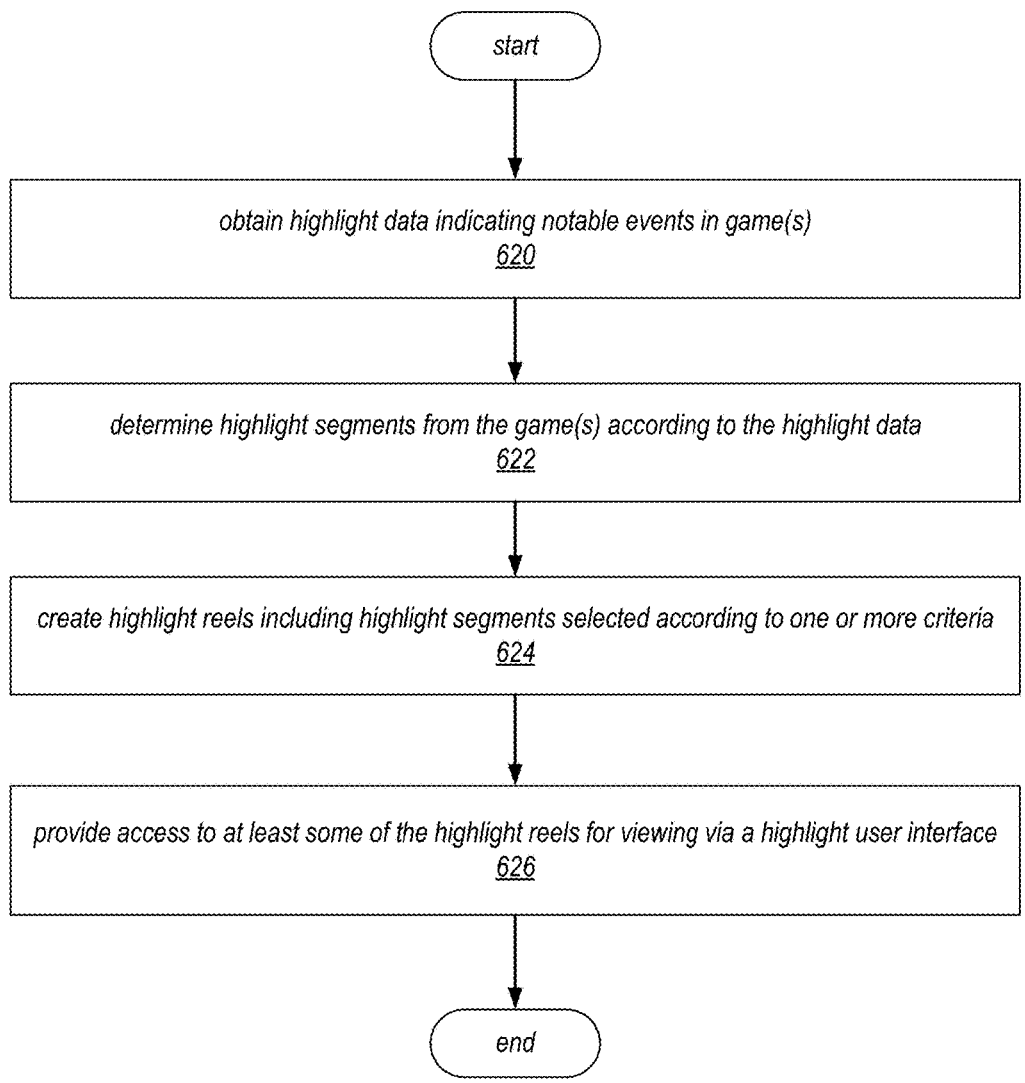
FIG. 6B is a more detailed flowchart of a method for determining and presenting highlights from games that are not necessarily broadcast, according to at least some embodiments.

FIG. 6A shows a method for determining and presenting highlights from broadcasts in a game spectating environment. However, in some embodiments, highlights may be determined from games that are not necessarily broadcast, and the highlights may be presented to viewers via the game spectating system. FIG. 6B is a method for determining and presenting highlights from games that are not necessarily broadcast, according to at least some embodiments. As indicated at 620 of FIG. 6B, a highlight service may obtain highlight data indicating notable events in games and/or games being broadcast. FIGS. 4A through 4F illustrate examples of highlight data and of methods for obtaining the highlight data in a highlight service. As indicated at 622 of FIG. 6B, the highlight service may determine highlight segments from the games according to the highlight data. FIGS. 4A through 4F illustrate example methods for determining highlight segments from games according to the various highlight data. As indicated at 624 of FIG. 6B, the highlight service may create highlight reels including highlight segments from the games selected according to one or more criteria. FIG. 5 illustrates and example methods for generating highlight reels from determined highlight segments. As indicated at 626 of FIG. 6B, the highlight service may present and provide access to at least some of the highlight reels for viewing, for example on spectator devices via a highlight user interface. FIGS. 5, 7, 8, and 10 provide non-limiting examples of methods for presenting highlights and highlight reels to spectators via highlight user interfaces.

FIG. 7 provides a non-limiting example of a spectating user interface for a game spectating system that includes highlight user interface elements, according to some embodiments. A spectating UI 802 may, for example be presented as a Web page of a game spectating website via a Web browser, as an interface to a game spectating Web application or mobile application, or as an interface to other network-based applications. A spectating UI 802 may include one or more panes or regions including one or more of, but not limited to, controls 810, current broadcast pane 830, highlight pane 840, games 850, channels 860, and video on demand 870. Controls 810 may include one or more UI elements for navigating or otherwise interacting with the game spectating service. Games 850 may display UI elements 852 corresponding to one or more online games 852 supported by or currently available through the game spectating system. This example shows a racing 852A game, a football 852B game, and a space explorer 852C game. Channels 860 may display UI elements 862 corresponding to one or more currently active (or upcoming) broadcasts or channels 862, for example channels 862 corresponding to broadcasters for a currently selected game 852. In this example, the space explorer 852C game is selected, and channels 862 shows three broadcasters A, B, and C for the currently selected game 852C. Video on demand 870 may, for example, display UI elements 872 corresponding to one or more videos 872, including but not limited to previously recorded broadcasts and/or highlight reels that are available for viewing. In this example, video on demand 870 shows example pre-recorded videos 872A-872C and a highlight reel 872D for the currently selected game 852C. While not shown, in some embodiments, a spectating UI 802 may include a recommendations pane that may display UI elements corresponding to one or more of recommended games 852, channels 862 (broadcasters), and recorded videos 872 including but not limited to highlight reels.

In some embodiments, content of recommendations, channels 860 and/or video on demand 870 may be determined at least in part according to a currently selected game

852. For example, in some embodiments, a spectator may select a game 852C to view the currently active channels 862 for the selected game 852, and to view recordings of broadcasts for the selected game 852. While not shown, in some embodiments, the UI 802 may allow the spectator to select particular broadcasters, and the content of recommendations, channels 860 and/or video on demand 870 may be determined at least in part according to the currently selected broadcaster.

Current broadcast pane 830 may include a video player 832 that displays the video stream for a currently selected live broadcast or channel 862 (in this example, channel 862A), or a currently selected video 872 being played to the respective spectator device. The video stream may include game play video, for example shown from the broadcaster/player's viewpoint or perspective or from a bird's eye view, and a window showing a live view of the broadcaster/player, in this example broadcaster/player A. The video player 832 typically also plays an audio stream that may include one or more of the in-game audio, broadcaster audio, and the audio commentary or "crowd noise" from the spectators. In some embodiments, the audio may also include commentary or play-by-play calls from a commentator. In some embodiments, current broadcast pane 830 may also include a chat 836 pane in which broadcaster and/or spectator text chat may be displayed. In some embodiments, current broadcast pane 830 may also include a highlight input 834 pane including one or more UI elements via which spectators can mark or tag highlight events (e.g., highlight start and highlight end events) in the current broadcast and/or vote (e.g., up or down vote) on highlight events.

In some embodiments, spectating UI 802 may include a highlight pane 840 via which a spectator may select and view highlights and highlight reels. Highlight pane 840 may include a current highlight 842 pane that displays a current highlight, for example a highlight from a currently active or selected highlight reel or a highlight from a current broadcast, and one or more UI elements via which a spectator can control the current highlight 842 display. Highlight pane 840 may include one or more UI elements via which spectators may vote (e.g., with an up or down vote) on the current highlight 842. Highlight pane 840 may also include a highlight filter/preferences pane 844 that may include one or more UI elements via which a spectator may select highlights and/or specify their highlight viewing preferences, for example by selecting genres, games, types of highlights (e.g., types of plays), highlight segment window length (e.g., short or long), and/or broadcasters/players of interest to the spectator.

FIG. 8 provides a non-limiting example of a highlight user interface for a game spectating system, according to some embodiments. A highlight UI 902 may, for example be presented as a Web page of a game spectating website via a Web browser, as an interface to a game spectating Web application or mobile application, or as an interface to other network-based applications. A highlight UI 902 may include one or more panes or regions including one or more of, but not limited to, controls 910 and a highlight pane 940 via which a spectator may select and view highlight reels. Controls 910 may include one or more UI elements for navigating or otherwise interacting with the game spectating service. Highlight pane 940 may include a current highlight reel 942 pane that displays highlights from a currently selected highlight reel 948.

Highlight pane 940 may also include a highlight info/controls 944 pane that may display information about a currently selected highlight reel 948 (reel 948A, in this example) and/or a highlight from the reel 948. Highlight info/controls 944 pane may also include one or more UI elements via which a spectator can control the current highlight reel 942 display, for example pause/resume, volume, and forward/backward controls. Highlight info/controls 944 pane may also include one or more UI elements via which a spectator may vote (e.g., with an up or down vote) on a current highlight 942.

Highlight pane 940 may also include a highlight filter/preferences pane 944 that may include one or more UI elements via which a spectator may specify their highlight reel viewing preferences, for example by selecting genres, games, broadcasters/players, and/or time frames of interest to the spectator. In some embodiments, highlight pane 940 may include an available highlight reels 946 pane that may display one or more available highlight reels 948, for example reels 948 determined according to the spectators' current preferences 944.

FIG. 9 provides a non-limiting example of a broadcaster user interface for a game spectating system, according to some embodiments. A broadcaster's device 1000 may implement a game and broadcasting UI 1002, and may include an A/V device 1008 (e.g., a video camera) to collect broadcaster/player 1020 audio and video input and speakers 1004 to output game audio (including spectator audio and/or crowd noise.).

In some embodiments, UI 1002 may include a game play window 1010 that displays a current view of the game universe for the broadcaster/player 1020. Note that the broadcaster's view of the game universe as shown in window 1010 may be included in the broadcast and shown to spectators, for example as shown in FIG. 10. UI 1002 may also include game controls 1014 via which the broadcaster/player 1020 may interact with the game system. In some embodiments, UI 1002 may include in-game chat 1014 via which the broadcaster/player 1020 may communicate to other players in the game via text. UI 1002 may also include broadcast controls 1018 via which the broadcaster/player 1020 may interact with the spectating system to control the broadcast. In some embodiments, UI 1002 may include broadcast chat 1018 via which the broadcaster/player 1020 and spectators may communicate via text.

In some embodiments, a world map 1012 or portion of a map of the online game world may be displayed on UI 1002, for example as a window within or overlaying the game play window 1010. Broadcaster/player A's team location is shown by the oval marked with an "A". In some embodiments, players, teams, areas, regions, or locations corresponding to current or potential highlight events that have been identified by one or more of the methods as described herein may be marked or highlighted or otherwise visually indicated on the map 1012. Broadcaster/player A and his team may, in some cases, take action based upon the visual indications of highlights displayed on the map 1012.

FIG. 10 provides another non-limiting example of a spectating user interface for a game spectating system, according to some embodiments. A spectator's device 1100 may implement a spectating UI 1102, and may include a microphone to collect spectator audio input and speakers to output game audio (including spectator audio and/or crowd noise, broadcaster audio commentary, etc.).

In some embodiments, UI 1102 may include a game spectating window 1110 that displays a current view of the game universe from the broadcaster/player's perspective. UI 1102 may also include spectator controls 1116 via which the spectator 1160 may interact with the spectating system to control the broadcast, select other broadcasts, and so on. In some embodiments, UI 1102 may include broadcast chat 1118 via which the spectator 1160 may communicate with the broadcaster/player and other spectators via text.

In some embodiments, UI 1102 may include a window 1114 showing a live view of the broadcaster/player, in this example broadcaster/player A. Window 1114 may be displayed, for example, as a window within or overlaying the game spectating window 1110. In some embodiments, a world map 1112 or portion of a map of the online game world may be displayed on UI 1102, for example as a window within or overlaying the game spectating window 1110. Broadcaster/player A's team location is shown by the oval marked with an "A".

In some embodiments, UI 1102 may include a highlight window 1122 that shows highlights or highlight reels, in this example broadcaster/player A. Highlight window 1122 may be displayed, for example, as a window within or overlaying the game spectating window 1110. In some embodiments, UI 1102 may include a highlight interface 1120 via which a spectator 1160 may interact with a highlight service as described herein to, for example, select highlights or highlight reels to be displayed, set up filters for highlights and highlight reels, vote on highlights, and so on.

In some embodiments, players, teams, areas, regions, or locations corresponding to current or potential highlight events that have been identified by one or more of the methods as described herein may be marked or highlighted or otherwise visually indicated on the world map 1112. For example, the oval marked "H!" may indicate a location for a past, current, or upcoming highlight event. In some embodiments, the spectator 1160 may select an indicated highlight from the world map 1112 to view the highlight in highlight window 1122. In this example, spectator 1160 is currently viewing a first group of players B, C and D from the perspective of player A (the broadcaster) in spectating window 1110, while watching a highlight involving players E, F, and G in highlight window 1122.

Example Online Gaming Network Environments

FIG. 11 illustrates an example network-based game and game spectating environment, according to at least some embodiments. Embodiments of game systems, game spectating systems, and other systems and services that implement the methods and apparatus for determining and presenting highlights in game spectating environments as described herein in reference to FIGS. 1 through 10 may be implemented in the context of a service provider that provides virtualized resources (e.g., virtualized computing resources, virtualized storage resources, virtualized database (DB) resources, etc.) on a provider network 1990 to clients of the service provider, for example as illustrated in FIG. 11. Virtualized resource instances may be provisioned via one or more provider network services 1992, and may be rented or leased to the clients of the service provider, for example to developer 1970 clients that develop and provide game systems 1900 or other systems or services via the provider network 1990 and services 1992.

In at least some embodiments, one or more developers 1970 may access one or more of services 1992 of the provider network 1990 via application programming interfaces (APIs) to the services 1992 to configure a game system 1900 and/or game spectating service 1930 on the provider network 1990. A game system 1900 or game spectating service 1930 may include multiple virtualized resource instances (e.g., computing resources, storage resources, DB resources, etc.).

At least some of the resource instances on the provider network 1990 (e.g., computing resources) may be implemented according to hardware virtualization technology that enables multiple operating systems to run concurrently on a host computer, i.e. as virtual machines (VMs) on the host. The provider network 1990, via the services 1992, may enable the provisioning of logically isolated sections of the provider network 1990 to particular clients as client private networks on the provider network 1990. At least some of a client's resources instances on the provider network 1990 may be provisioned in the client's private network. For example, in FIG. 11, one or more game systems 1900 may be implemented as or in private networks of respective developers 1970 that are provisioned on provider network 1990 via one or more of the services 1992. As another example, a game spectating service 1930 may be provisioned in private networks on provider network 1990 via one or more of the services 1992.

The provider network 1990, via the services 1992, may provide flexible provisioning of resource instances to clients in which virtualized resource instances can be automatically added to or removed from a configuration on the provider network 1990 in response to changes in demand or usage, thus enabling an implementation on the provider network 1990 to automatically scale to handle computation and/or storage needs. For example, one or more additional computing and/or storage resources may be automatically added to a game system 1900 and/or to game spectating service 1930 in response to an increase in game playing, broadcasting, and/or game spectating from player/broadcaster devices 1920 and/or spectator devices 1980. Conversely, if and when usage drops below a threshold, resources can be removed from a game system 1900 and/or game spectating service 1930.

Illustrative System

In at least some embodiments, a computing device that implements a portion or all of the methods and apparatus for determining and presenting highlights in game spectating environments as described herein may include a general-purpose computer system that includes or is configured to access one or more computer-accessible media, such as computer system 2000 illustrated in FIG. 12. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for determining and presenting highlights in game spectating environments, are shown stored within system memory 2020 as code 2025 and data 2026.

In one embodiment, I/O interface 2030 may be configured to coordinate I/O traffic between processor 2010, system memory 2020, and any peripheral devices in the device 2000, including network interface 2040, input/output (I/O) devices, or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, I/O interface 2030 may support one or more input/output peripheral devices or components 2070 of system 2000, such as cursor control, keyboard, display, video, and/or audio I/O devices 2070 or components. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into at least one processor 2010.

Network interface 2040 may be configured to allow data to be exchanged between computer system 2000 and other devices 2060 attached to a network or networks 2050, such as other computer systems or devices as illustrated in FIGS. 1 through 11, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 11 for implementing embodiments of methods and apparatus for determining and presenting highlights in game spectating environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices configured to implement a game spectating service configured to stream a plurality of broadcasts received from a plurality of broadcaster devices to a plurality of spectator devices, wherein each broadcast includes video showing game play of a respective broadcaster participating as a player in a game executing on one of a plurality of game systems;
   one or more computing devices configured to implement a highlight service configured to:
      receive game event data from the plurality of game systems according to an application programming interface (API) to the highlight service, wherein the game event data received from a given game system indicates one or more notable events in a game executing on the respective game system as determined from the respective game event data, and wherein the game event data includes participant highlight tags that indicate one or more participant-specified notable events in the game;
      determine a plurality of highlight segments from the plurality of broadcasts, wherein one or more of the plurality of highlight segments are determined according to the received game event data and the participant highlight tags, wherein each highlight segment includes a portion of a respective broadcast showing a notable event from a respective game, and wherein the one or more highlight segments are determined based at least in part on a corresponding participant highlight tag and satisfying a spectator voting threshold; and
      provide access to at least some of the plurality of highlight segments for viewing by spectators via game spectating clients executing on the plurality of spectator devices.

2. The system as recited in claim 1, wherein the game event data comprises a plurality of game event records each including at least a game identifier and a game timestamp, and wherein, to determine the plurality of highlight segments from the plurality of broadcasts, the highlight service is configured to correlate the game event records to highlight segments in respective broadcasts according to the game identifiers and the game timestamps in the game event records.

3. The system as recited in claim 1, wherein the highlight service is further configured to:
  receive audio input from the broadcaster devices and the spectator devices; and
  analyze the audio input to generate audio analysis data for the plurality of broadcasts, wherein the audio analysis data for a given broadcast indicates one or more notable events in the respective broadcast as determined from content of the audio input for the respective broadcast;
  wherein at least one of the plurality of highlight segments is determined according to the audio analysis data.

4. The system as recited in claim 1, wherein the highlight service is further configured to:
  receive text chat input from the broadcaster devices and the spectator devices; and
  analyze the text chat input to generate chat analysis data for the plurality of broadcasts, wherein the chat analysis data for a given broadcast indicates one or more notable events in the respective broadcast as determined from content of the text chat input for the respective broadcast;
  wherein at least one of the plurality of highlight segments is determined according to the chat analysis data.

5. The system as recited in claim 1, wherein the highlight service is further configured to:
  receive video input from the broadcaster devices, wherein the video input from a given broadcaster device shows a respective broadcaster when participating as a player in a respective game; and
  analyze the video input to generate video analysis data for the plurality of broadcasts, wherein the video analysis data for a given broadcast indicates one or more notable events in the respective broadcast as determined from physical actions of the respective broadcaster as shown in the respective video input;
  wherein at least one of the plurality of highlight segments is determined according to the video analysis data.

6. The system as recited in claim 1, wherein the highlight service is further configured to:
  receive participant highlight input from participants in the respective broadcasts via user interfaces on the participants' respective devices, wherein the participant highlight input for a given broadcast indicates one or more notable events in the respective broadcast as specified by one or more participants in the respective broadcast via the user interfaces on the respective devices;
  wherein the one or more participant highlight tags are based at least in part on the participant highlight input.

7. A method, comprising:
  performing, by a spectating system implemented on one or more computing devices:
    streaming a plurality of broadcasts received from a plurality of broadcaster devices to a plurality of spectator devices, wherein each broadcast shows video of a respective broadcaster;
    obtaining highlight data indicating notable events in the broadcasts, wherein the highlight data includes participant highlight tags that indicate participant-specified notable events in the broadcasts;
    determining a plurality of highlight segments from the plurality of broadcasts according to the highlight data, wherein each highlight segment includes a portion of a respective broadcast showing a notable event from the broadcast determined according to respective highlight data and the respective participant highlight tags for the broadcast and satisfying a spectator voting threshold; and
    providing access to at least some of the plurality of highlight segments for viewing on the plurality of spectator devices via a user interface (UI) to the spectating system.

8. The method as recited in claim 7, wherein at least one broadcast shows game play of a respective broadcaster participating as a player in a game executing on one of a plurality of game systems.

9. The method as recited in claim 8, wherein said obtaining highlight data indicating notable events in the broadcasts comprises receiving game event data from at least one of the plurality of game systems according to an application programming interface (API) to the spectating system, wherein the game event data received from a given game system indicates one or more notable events in a game executing on the respective game system.

10. The method as recited in claim 9, wherein the highlight data is received from the game systems as metadata included with video in the broadcasts received from the broadcaster devices.

11. The method as recited in claim 9, wherein the game event data comprises a plurality of game event records each including at least a game identifier and a game timestamp, and wherein said determining the plurality of highlight segments from the plurality of broadcasts comprises:
  correlating the game event records to the broadcasts according to the game identifiers; and
  identifying the highlight segments in the broadcasts according to the game timestamps in the respective game event records.

12. The method as recited in claim 7, further comprising:
  receiving audio input from the broadcaster devices and the spectator devices;
  analyzing the audio input to generate audio analysis data for the plurality of broadcasts, wherein the audio analysis data for a given broadcast indicates one or more notable events in the respective broadcast as determined from content of the audio input for the respective broadcast; and
  wherein said determining the plurality of highlight segments from the plurality of broadcasts comprises determining at least one of the plurality of highlight segments according to the audio analysis data.

13. The method as recited in claim 7, further comprising:
  receiving text chat input from the broadcaster devices and the spectator devices;
  analyzing the text chat input to generate chat analysis data for the plurality of broadcasts, wherein the chat analysis data for a given broadcast indicates one or more notable events in the respective broadcast as determined from content of the text chat input for the respective broadcast;
  wherein said determining the plurality of highlight segments from the plurality of broadcasts comprises determining at least one of the plurality of highlight segments according to the chat analysis data.

14. The method as recited in claim 7, further comprising:
  receiving video inputs from one or more client devices, wherein the video input from a given client device shows a respective broadcaster or spectator when participating in the broadcast; and
  analyzing the video inputs to generate video analysis data for the plurality of broadcasts, wherein the video analysis data for a given broadcast indicates one or more notable events in the respective broadcast as determined from physical actions of participants in the broadcast as shown in the respective video inputs for the broadcast;

wherein said determining the plurality of highlight segments from the plurality of broadcasts comprises determining at least one of the plurality of highlight segments according to the video analysis data.

15. The method as recited in claim 14, wherein the video inputs show faces of respective participants, and wherein said analyzing the video inputs to generate video analysis data comprises analyzing facial expressions to detect emotions or states of respective participants.

16. The method as recited in claim 7, further comprising:
receiving spectator highlight input from spectators of the respective broadcasts via spectating user interfaces on the spectator devices, wherein the spectator highlight input for a given broadcast indicates one or more notable events in the respective broadcast as specified by one or more spectators of the respective broadcast via the spectating user interfaces on the respective spectator devices;
wherein said determining the plurality of highlight segments from the plurality of broadcasts comprises determining at least one of the plurality of highlight segments according to the spectator highlight input.

17. The method as recited in claim 7, further comprising:
receiving broadcaster highlight input from broadcasters of the respective broadcasts via broadcasting user interfaces on the broadcaster devices, wherein the broadcaster highlight input for a given broadcast indicates one or more notable events in the respective broadcast as specified by the broadcaster of the respective broadcast;
wherein said determining the plurality of highlight segments from the plurality of broadcasts comprises determining at least one of the plurality of highlight segments according to the broadcaster highlight input.

18. The method as recited in claim 7, further comprising:
applying a machine learning analysis technique to the broadcasts to detect highlight events in broadcast video, wherein the machine learning analysis technique compares attributes from previously determined highlight segments to attributes determined from the broadcast video to detect the highlight events;
wherein said determining the plurality of highlight segments from the plurality of broadcasts comprises determining at least one of the plurality of highlight segments according to the detected highlight events.

19. The method as recited in claim 7, further comprising:
applying a statistically improbable event analysis technique to metadata for the broadcasts to detect statistically improbable events in broadcast video, wherein the statistically improbable event analysis technique compares statistics from previous broadcasts to the metadata for the broadcasts to detect the statistically improbable events;
wherein said determining the plurality of highlight segments from the plurality of broadcasts comprises determining at least one of the plurality of highlight segments according to the detected statistically improbable events.

20. The method as recited in claim 7, wherein said determining a plurality of highlight segments from the plurality of broadcasts according to the highlight data comprises:
determining highlight events in the broadcasts; and
for each determined highlight event, determining a temporal window around the highlight event, wherein the windows provide context for the determined highlight events.

21. The method as recited in claim 7, wherein said determining a window around a highlight event comprises dynamically determining the window according to window attributes from one or more previously determined highlight segments.

22. The method as recited in claim 7, wherein said determining a window around a highlight event comprises determining the window according to specified window parameters.

23. The method as recited in claim 7, wherein said determining a window around a highlight event comprises determining the window according to spectator preferences.

24. The method as recited in claim 7, further comprising:
determining a set of two or more of the highlight segments according to one or more highlight selection criteria;
generating a highlight reel including the set of highlight segments; and
streaming the highlight reel to at least one of the plurality of spectator devices for display via the UI.

25. The method as recited in claim 24, wherein the one or more highlight selection criteria include game genres, game titles, broadcasters, and time periods.

26. The method as recited in claim 7, further comprising:
receiving highlight viewing preferences from spectators of the respective broadcasts via game spectating user interfaces on the spectator devices;
determining a set of two or more of the highlight segments according to the highlight viewing preferences of a particular spectator;
generating a highlight reel including the set of highlight segments; and
streaming the highlight reel to at least the spectator device of the particular spectator for display via the UI.

27. A non-transitory computer-readable storage medium storing program instructions that when executed on one or more computers cause the one or more computers to implement a highlight service for a game spectating system, the highlight service configured to:
receive game event data from a plurality of game systems according to an application programming interface (API) to the highlight service, wherein the game event data received from a given game system indicates one or more notable events in a game executing on the respective game system as determined from the respective game event data, and wherein the game event data includes participant highlight tags that indicate one or more participant-specified notable events in the game;
determine a plurality of highlight segments from a plurality of broadcasts, wherein one or more of the plurality of highlight segments are determined according to the received game event data and the participant highlight tags and satisfying a spectator voting threshold, wherein each broadcast shows game play of a respective broadcaster participating as a player in a game executing on one of the plurality of game systems, wherein each highlight segment includes a portion of a respective broadcast showing a notable event from a respective game; and
present at least some of the plurality of highlight segments from the plurality of broadcasts for viewing on a plurality of spectator devices via a user interface (UI) to the highlight service.

28. The non-transitory computer-readable storage medium as recited in claim 27, wherein the highlight service is further configured to:
- obtain highlight data indicating notable events in the plurality of broadcasts, wherein the highlight data includes one or more of broadcaster and spectator audio input to the broadcasts, broadcaster and spectator text chat input to the broadcasts, and broadcaster and spectator video input to the broadcasts; and
- analyze the highlight data to generate analysis data for the plurality of broadcasts, wherein the analysis data for a given broadcast indicates one or more notable events in the respective broadcast as determined from the highlight data for the respective broadcast; and
- determine at least one of the plurality of highlight segments according to the analysis data.

* * * * *